United States Patent
Liguori et al.

(10) Patent No.: US 10,778,521 B2
(45) Date of Patent: Sep. 15, 2020

(54) RECONFIGURING A SERVER INCLUDING A RECONFIGURABLE ADAPTER DEVICE

(71) Applicant: Amazon Technologies, Inc., Seattle, WA (US)

(72) Inventors: Anthony Nicholas Liguori, Bainbridge Island, WA (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/418,898

(22) Filed: May 21, 2019

(65) Prior Publication Data

US 2019/0273654 A1 Sep. 5, 2019

Related U.S. Application Data

(63) Continuation of application No. 15/377,973, filed on Dec. 13, 2016, now Pat. No. 10,374,885.

(51) Int. Cl.
*G06F 15/177* (2006.01)
*H04L 12/24* (2006.01)
(Continued)

(52) U.S. Cl.
CPC .......... *H04L 41/082* (2013.01); *G06F 9/445* (2013.01); *G06F 9/45541* (2013.01);
(Continued)

(58) Field of Classification Search
CPC ........ G06F 15/167; G06F 16/00; G06F 9/445; G06F 9/45541; G06F 9/5072;
(Continued)

(56) References Cited

U.S. PATENT DOCUMENTS 5,889,987 A    3/1999 Nelson et al.
9,396,329 B2   7/2016 Vaidyanathan et al.
(Continued)

FOREIGN PATENT DOCUMENTS

CN    101894233    11/2010
EP    3089035      11/2016

OTHER PUBLICATIONS

EP17825345.6, "Office Action", dated Apr. 14, 2020, 5 pages.
(Continued)

*Primary Examiner* — Liang Che A Wang
(74) *Attorney, Agent, or Firm* — Kilpatrick Townsend & Stockton LLP

(57) ABSTRACT

Techniques for reconfiguring a server to perform various hardware functions are disclosed herein. In one embodiment, a client device sends an instance request to a compute service system for launching an instance. The instance request indicates a resource requirement for the instance. In response to the instance request, the compute service system selects a server from among a plurality of servers in the compute service system based on determining that the server is configurable to at least partially meet the resource requirement. The compute service system then sends a provisioning request to the selected server. The provisioning request includes information for programming a reconfigurable resource of an adapter device in the selected server according to a particular hardware function.

20 Claims, 12 Drawing Sheets

(51) Int. Cl.
| | |
|---|---|
| H04L 29/06 | (2006.01) |
| G06F 15/167 | (2006.01) |
| G06F 9/445 | (2018.01) |
| G06F 9/455 | (2018.01) |
| H04L 29/08 | (2006.01) |
| G06F 9/50 | (2006.01) |
| H04L 12/66 | (2006.01) |
| G06F 16/00 | (2019.01) |

(52) U.S. Cl.
CPC .......... *G06F 9/5072* (2013.01); *G06F 15/167* (2013.01); *G06F 16/00* (2019.01); *H04L 12/66* (2013.01); *H04L 67/10* (2013.01); *H04L 67/2814* (2013.01); *H04L 67/42* (2013.01)

(58) Field of Classification Search
CPC ....... H04L 12/66; H04L 41/082; H04L 67/10; H04L 67/2814; H04L 67/42
USPC ................................. 709/217, 220, 221, 223
See application file for complete search history.

(56) References Cited

U.S. PATENT DOCUMENTS

| | | | |
|---|---|---|---|
| 10,374,885 B2 | 8/2019 | Liguori et al. | |
| 2003/0140238 A1 | 7/2003 | Turkboylari | |
| 2004/0068723 A1* | 4/2004 | Graupner | G06F 8/71 717/171 |
| 2005/0021968 A1 | 1/2005 | Zimmer et al. | |
| 2005/0120160 A1* | 6/2005 | Plouffe | G06F 9/4856 711/1 |
| 2005/0235000 A1* | 10/2005 | Keil | H04L 63/08 |
| 2006/0026417 A1 | 2/2006 | Furusawa et al. | |
| 2006/0117156 A1 | 6/2006 | Chai et al. | |
| 2009/0138896 A1 | 5/2009 | McKenney et al. | |
| 2009/0157417 A1* | 6/2009 | Bradley | G06Q 30/0185 705/318 |
| 2009/0287900 A1 | 11/2009 | Kirscht et al. | |
| 2010/0306519 A1 | 12/2010 | Buonpane et al. | |
| 2011/0107047 A1 | 5/2011 | Sela et al. | |
| 2012/0255010 A1 | 10/2012 | Sallam | |
| 2013/0041906 A1* | 2/2013 | Adar | G09B 7/00 707/750 |
| 2014/0258446 A1* | 9/2014 | Bursell | H04L 41/0816 709/217 |
| 2015/0154031 A1 | 6/2015 | Lewis | |
| 2016/0019116 A1 | 1/2016 | Gopal et al. | |
| 2016/0070913 A1* | 3/2016 | Kulkarni | G06F 21/575 713/2 |
| 2016/0301742 A1* | 10/2016 | Lowery | G06F 3/067 |
| 2016/0323143 A1* | 11/2016 | Kim | G06F 9/4411 |
| 2017/0161497 A1 | 6/2017 | Jeansonne et al. | |
| 2017/0168851 A1 | 6/2017 | Lin | |
| 2017/0195723 A1* | 7/2017 | Wang | H04L 43/08 |
| 2017/0344552 A1* | 11/2017 | Golbandi | G06F 16/24578 |
| 2018/0089435 A1 | 3/2018 | Zander et al. | |
| 2018/0097839 A1 | 4/2018 | Upasani et al. | |

OTHER PUBLICATIONS

"Expansion Card", Available online at: https://en.wikipedia.org/w/index.php?title=Expansion_card&oldid=639881853, Dec. 28, 2014, 5 pages.
"Motherboard", Wikipedia Article, Available Online at: https://en.wikipedia.org/w/index.php?title=Motherboard&oldid=854966281, Jul. 16, 2015, 8 pages.
U.S. Appl. No. 15/377,973, "Final Office Action", dated Dec. 17, 2018, 10 pages.
U.S. Appl. No. 15/377,973, "Non-Final Office Action", dated Sep. 11, 2018, 10 pages.
U.S. Appl. No. 15/377,973, "Notice of Allowance", dated Mar. 26, 2019, 8 pages.
U.S. Appl. No. 15/377,973, "U.S. Patent Application No.", Reconfigurable Server, Dec. 13, 2016,.
U.S. Appl. No. 15/377,991, "U.S. Patent Application No.", Secure Execution Environment on a Server, Dec. 13, 2016.
PCT/US2017/065984, "International Search Report and Written Opinion", dated Mar. 28, 2018, 13 pages.
PCT/US2017/065992, "International Search Report and Written Opinion", dated Mar. 2, 2018, 12 pages.
PCT/US2017/065992, "International Preliminary Report on Patentability", dated Jun. 27, 2019, 8 pages.
CN201780077097.8, "Office Action", dated Dec. 2, 2019, 22 pages.
CN201780077097.8, "Office Action", dated Jun. 1, 2020, 18 pages.
EP17823313.6, Office Action, dated May 18, 2020, 9 pages.

* cited by examiner

RECONFIGURING A SERVER INCLUDING A RECONFIGURABLE ADAPTER DEVICE

CROSS REFERENCE TO RELATED APPLICATIONS

This application claims priority to and is a continuation of U.S. application Ser. No. 15/377,973, filed Dec. 13, 2016, and titled "RECONFIGURABLE SERVER INCLUDING A RECONFIGURABLE ADAPTER DEVICE", the contents of which are herein incorporated in its entirety for all purposes.

BACKGROUND

Many organizations provide computing services over a plurality of communication networks. The computing services may include, for example, web-based services such as web storage or virtual servers that can be provided over the Internet to different clients. In some cases, servers may be rented out to clients based on need or usage.

A compute service system may include servers with fixed hardware resources. In most cases, the fixed hardware resources on a compute service system may not be utilized efficiently due to irregular workload demands. For example, at a certain time, demand for servers having a specific configuration of hardware resources may be low but demand for servers having a different configuration may be high. Hence, a compute service system may not be utilized efficiently due to fixed hardware resources of servers in different pools of capacity and the irregular workload demands from clients.

BRIEF DESCRIPTION OF THE DRAWINGS

Various embodiments in accordance with the present disclosure will be described with reference to the drawings, in which.

DETAILED DESCRIPTION

Figure 1:
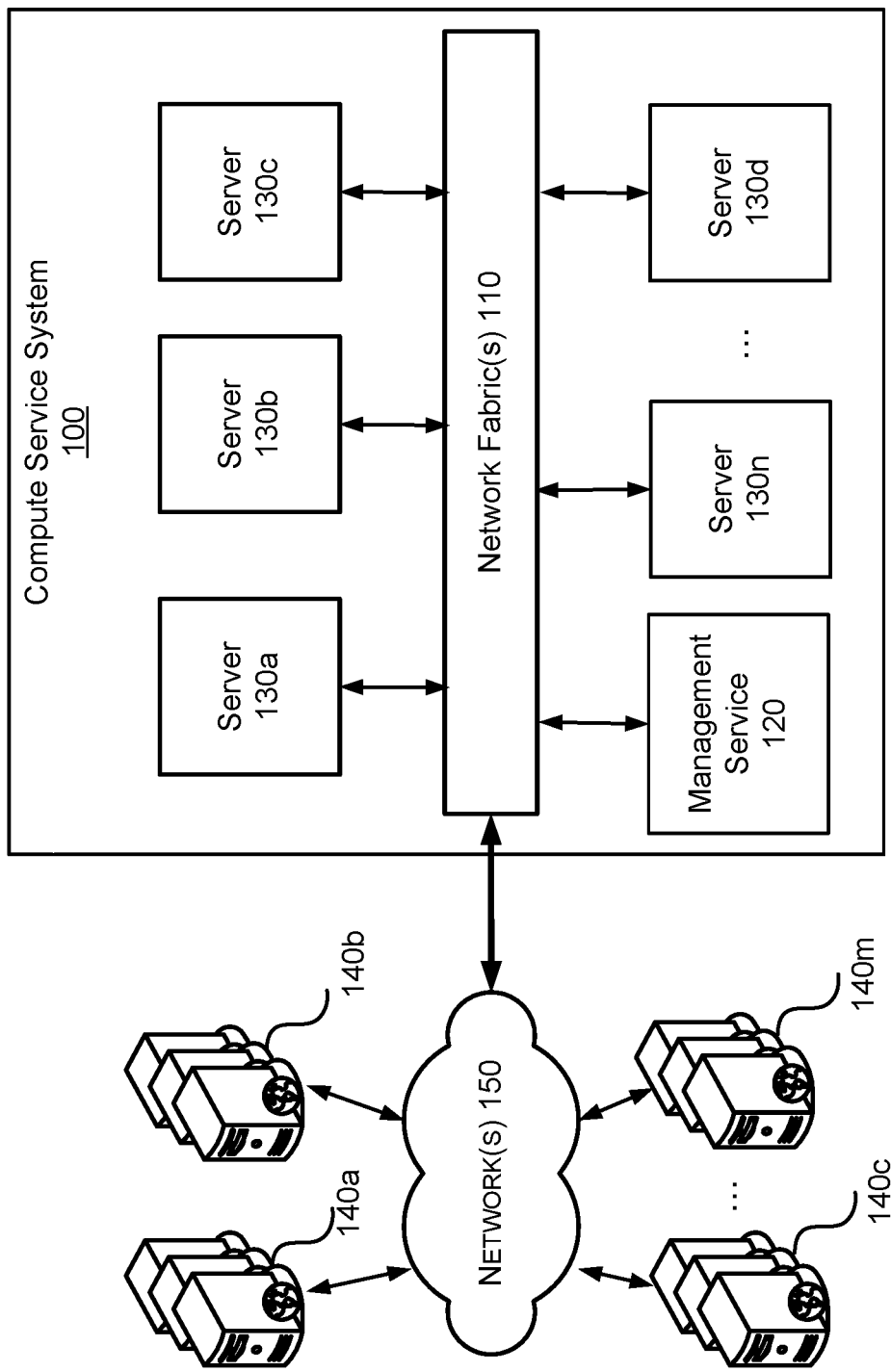
FIG. 1 illustrates an example compute service system in a web-based service environment, according to certain aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A compute service system may include a plurality of servers that can run workloads (e.g., virtual machines or operating systems directly on the server hardware). In the present disclosure, the terms "client," "customer," "user," and "tenant" may be used interchangeably. The term "instance" may refer to, for example, an instance that runs directly on a server (i.e., a bare-metal instance) or a virtual machine. Different types of instances generally correspond to hardware having different hardware functions or configurations. For example, one type of instances may correspond to a unique combination of CPU, memory, storage, and network capacity.

Generally, clients request instances from the compute service system (e.g., via a management entity or control plane system of the compute service system which controls the provisioning of instances on servers), and the management entity responds by provisioning a server (or a virtual machine on a server) and making the instance available to the client for use. Different clients may have different hardware requirements for their instances. For example, some clients may desire high computing power or graphic processing power, while others may want a large storage space or desire a high network traffic bandwidth. Furthermore, some clients may prefer one operating system over another operating system for various reasons. In order to provision different types of instances requested by the clients, servers with different hardware and software configurations may be needed.

A compute service system may include servers with fixed hardware resources, segmented into various pools such as a pool of servers that include graphics processing units (GPUs), a pool of servers that includes Solid State Drives (SSDs), etc. In many instances, these servers with fixed hardware resources on each server may not be utilized efficiently due to different types of hardware requested by clients. For example, a service provider may not have enough servers including the hardware to satisfy a given request from a client demanding a server with a GPU or other hardware.

In some cases, to more efficiently utilize the resources on the servers, a compute service system may include several types of servers, where each type of server may have a different hardware and/or software configuration or different fixed resources. For example, some servers may include multiple processors to satisfy customer demand for high computing power. Some servers may include a large memory or a large SSD-based local storage. Some servers may include high bandwidth or high speed network interfaces. Some servers may include dedicated GPUs. Depending on the instance requested by a client, a server that has a configuration that matches the client's requirement may be selected and allocated to the client. In this way, different types of instances may be provided by different types of servers, and the hardware resources of the servers may be more efficiently utilized.

However, in many cases, the demands from customers may be different at different times and may be difficult to predict. For example, at one time, a particular type of server may be in high demand, while at another time, a different type of server may be in high demand. Therefore, at some time, a compute service system may not have enough servers designed for some types of instances, and may have many idle servers designed for other types of instances. In some cases, a server with more resources than required may be used for an instance, and thus resources on the server may not be used efficiently. Furthermore, with different configurations for different types of servers, it may cost more to design, manufacture, maintain, and replace the different types of servers.

Embodiments of the present disclosure relate to a compute service system that includes multiple servers connected to one or more network fabrics, where the servers may have the same or similar hardware resources, but at least a portion of the hardware resources may be connected to other servers or reconfigured to perform different functions based on received or expected requests from customers. More specifically, a server may include an associated reconfigurable adapter device, where the reconfigurable adapter device may be reprogrammable to operate according to one or more of a plurality of different personalities, which in turn means that the adapter devices may be reprogrammed to execute different functions or connect to other servers that include hardware capable of executing different functions. Each personality of the reconfigurable adapter device may correspond to a different hardware configuration/function, in combination with the associated server. In some embodiments, the hardware configuration/function may be emulated by an emulation software using the hardware resources on the reconfigurable adapter device. In some embodiments, a personality may be associated with a vendor identification (ID) and a device ID indicating the hardware function of the personality. As such, when the CPU boots and enumerates devices attached to the motherboard, the reconfigurable adapter device can appear as one or more of a variety of different types of hardware devices, such as a GPU, co-processor, hard drive, FPGA device, random access memory, network adapter, etc.

The compute service system may include a management service (e.g., a control plane that includes a service that provisions instances) that can select a server and send a provisioning request, which could include information or data such as an emulator in executable code or microcode, or a configuration file to the reconfigurable adapter device, which may then use the information or data to configure itself according to a requested personality. In some embodiments, the server may include a management adapter device, which may receive the provisioning request from the management device and configure the reconfigurable adapter device using the information or data in the provisioning request. The reconfigurable adapter device and/or the server may then be rebooted to provide the required hardware and/or software configurations/functions. In this way, the compute service system may reduce the variation between different servers so as to minimize the number of idle servers based on a lack of requests for the specific hardware these idle servers have. This may also greatly reduce the cost of maintaining the servers, make the selection of the server easier, and improve the overall utilization of the servers in the compute service system.

In some cases, the management service may estimate the number of instances having a particular personality that may be requested at a future time and preconfigure corresponding number of servers based on the particular personality. In some cases, the management service may receive a specific request from a user, select a server, and send a provisioning request to the management adapter device or the reconfigurable adapter device on the compute code to provision the requested hardware function.

In some cases, the compute service system may also include some special-purpose resources or servers on the network fabrics, such as GPUs or storage devices, which may be shared and utilized by different clients to meet special service requirements of the clients. In this example embodiment, the provisioning request may cause the reconfigurable adapter device to configure itself to provide the function by running an emulator and connecting to one of the special-purpose resources, so that the adapter device handles some of the functionality and offloads some of the work of providing the function to the special-purpose resource. In some cases, the compute service system may include tiered resources for an instance. For example, a server may include faster local memory and may be configured to use additional memory on remote servers on the network fabrics. In some cases, a group of servers may be combined to provide an instance to a client.

In some cases, a server may be configured to include a hypervisor or an operating system, and the client may run applications on the provided operating system or run virtual machines using the provided hypervisor. In some cases, the server may be configured as a bare-metal system without a hypervisor or an operating system, and a client may load a customer operating system (or a customer hypervisor if desired) on the server.

FIG. 1 illustrates an example compute service system 100 in a web-based service environment, according to certain aspects of the present disclosure. In the web-based service environment, one or more clients may utilize client devices 140a-140m (collectively, client devices 140) to access compute service system 100 via one or more networks 150. For example, client devices 140 may access compute service system 100 using a web browser, a command line interface, or a web service Application Program Interface (API). Client devices 140 may include any appropriate device operable to send and receive requests, messages, or other information over an appropriate network 150 and convey information back to a user of the device. The device may include, for example but not limited to, a mobile phone, a smart phone, a Personal Digital Assistant (PDA), a laptop computer, a desktop computer, a thin-client device, a tablet, an electronic book (e-book) reader, etc.

In some examples, networks 150 may include any one or a combination of many different types of networks, such as cable networks, the Internet, wireless networks, cellular networks, and other private and/or public networks. Communications over the networks may be enabled by wired or wireless connections and combinations thereof. Networks 150 may support communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), etc.

Compute service system 100 may include a management service 120 and a plurality of servers 130*a*, 130*b*, 130*c*, 130*d*, . . . , and 130*n* (collectively, servers 130) in a distributed computing environment. Management service 120 and servers 130 may be communicatively coupled to one or more network fabrics 110, which may be connected to networks 150 through, for example, high speed network connection, such as InfiniBand, Data Center Ethernet (DCE), gigabit Ethernet, fiber channel, Fiber Channel over Ethernet (FCoE), etc. Network fabrics 110 may be any appropriate network, including an intranet, the Internet, a cellular network, a local area network, or any combination thereof. Network fabrics 110 may support communications using any of a variety of high speed communication protocols.

Servers 130 may include one or more servers arranged in a cluster as a server farm, or as individual servers not associated with one another. These servers may be configured to host instances. In some implementations, each server of servers 130 may have identical or similar hardware resources. In some implementations, servers 130 may include a plurality of different types of servers that may have different hardware/software resources and/or configurations. A server may include an operating system or virtualization system that provides executable instructions for the general administration and operation of that server, and may include a computer-readable storage medium (e.g., a hard disk, random access memory, read only memory, etc.) storing instructions that, when executed by a processor of the server, allow the server to perform its intended functions. The operating system or virtualization system may be any of a variety of commercially-available operating systems or customer operating systems. Clients may run various applications on the operating system.

Management service 120 may be a server or platform that is configured to manage a pool of heterogeneous resources (e.g., servers or specialized hardware resources), provide access to clients and end users, monitor security, and manage resource allocation. Management service 120 may also include a user interface that can be used by a system administrator to control management service 120 and a web service application program interface for receiving requests from customers to launch instances. For example, management service 120 may receive requests from client devices 140 or the system administrator and select one or more servers 130 to provision the requested instance(s) based on the specific request from the client or the system administrator. In some cases, management service 120 may allocate a predetermined number of resources to a client who may pay a flat fee or a monthly fee. In some cases, for a client that is charged on a pay-per-use basis, management service 120 may allocate resources to the client when the client needs them and decommission them when they are no longer needed, such that the resources can be allocated to other clients. Management service 120 may include a network interface for communication with network fabrics 110, a database for storing configurations and status of servers 130 connected to network fabrics 110, and a processing logic for selecting one or more available servers for an instance and performing other management functions.

As described above, client devices 140 may request different types of instances (e.g., virtual machines or servers) from compute service system 100. For example, in some cases, a client may request an instance that includes one or more GPUs. In some cases, a client may request an instance to perform high-performance computing for complex computational workloads, such as batch processing, distributed analytics, high performance scientific or engineering applications, gaming, or video-encoding. In such cases, a server with multiple (e.g., tens of or hundreds of) high-performance processors and large memory may be needed.

In some cases, a client may request an instance with hardware optimized for high speed, low latency, random I/O access to data, for example, to run very high performance Not-only (non-relational) Structured Query Language (NoSQL) databases (e.g., Apache Cassandra® and MongoDB), transactional databases, data warehousing, Apache Hadoop®, or cluster file systems. In such cases, servers with high input/output (I/O) performance storage supported by, for example, SSD technology may be used. In some cases, a client may request an instance with high-speed network communication capabilities for applications sensitive to network performance. In such cases, a server with a high-speed network link may be needed.

In some cases, a client may request an instance with high storage density and high speed sequential I/Os for data-intensive applications such as Massively Parallel Processing (MPP) data warehouse, Apache MapReduce and Hadoop® distributed computing, or log and data processing.

In some cases, a client may request an instance with access to a large volatile memory space. In such cases, a server with access to a large volatile memory, such as dynamic random access memory (DRAM), with a low latency may be needed. In some cases, a client may request an instance with access to a large non-volatile memory space. In such cases, a server with access to high-capacity non-volatile memory devices, such as SSDs or hard disks, may be needed. As used herein, volatile memory may refer to a type of data storage device whose contents may be lost when the power to the data storage device is turned off or interrupted, such as random access memory (RAM), while non-volatile memory may refer to a type of data storage device whose contents can persist even without power, such as read-only memory (ROM) or flash memory.

In some cases, a client may request an instance that includes a high performance computing (HPC) cluster, a GPU cluster, or a memory cluster, where the servers in the cluster are tightly coupled through node-to-node communication to achieve low-latency and high throughput network performance required by customer applications that need to perform network-intensive operations.

In some cases, a client may request a specific system hardware configuration. For example, the client may specify the number of processor cores, the size of the memory, the size of the storage device (e.g., SSD), and/or the operating system or Virtual Machine Monitor (VMM, i.e., hypervisor) needed for the applications. In some cases, the client may select a type of instance from multiple types of instances offered by the compute service system. For example, a compute service provider may offer different types or families of instances based on compute, memory, and storage capabilities, where different types of instances may provide different capabilities on computing performance, I/O performance, memory size and performance, storage size and performance, network performance, and graphic processing performance. In some cases, the client may request a particular operating system or hypervisor for the applications, such as Microsoft Windows®, Linux, Microsoft Hyper-V®, Citrix Xen®, VMware vSphere®, or open-source Kernel-based Virtual Machine (KVM). In some cases, the client may request a specific type of hardware, such as GPUs or SSDs.

Based on the specific requirement of the requested instance from a client, management service 120 may select one or more servers for the client. In implementations where all servers have same or similar hardware resources, management service 120 may randomly select any available server, or a cluster of available servers that are closely located for low-latency networking. In implementations where the servers may have different hardware resources, management service 120 may select a server that best matches the requirement of the client-requested instance with minimum extra resources.

Figure 2:
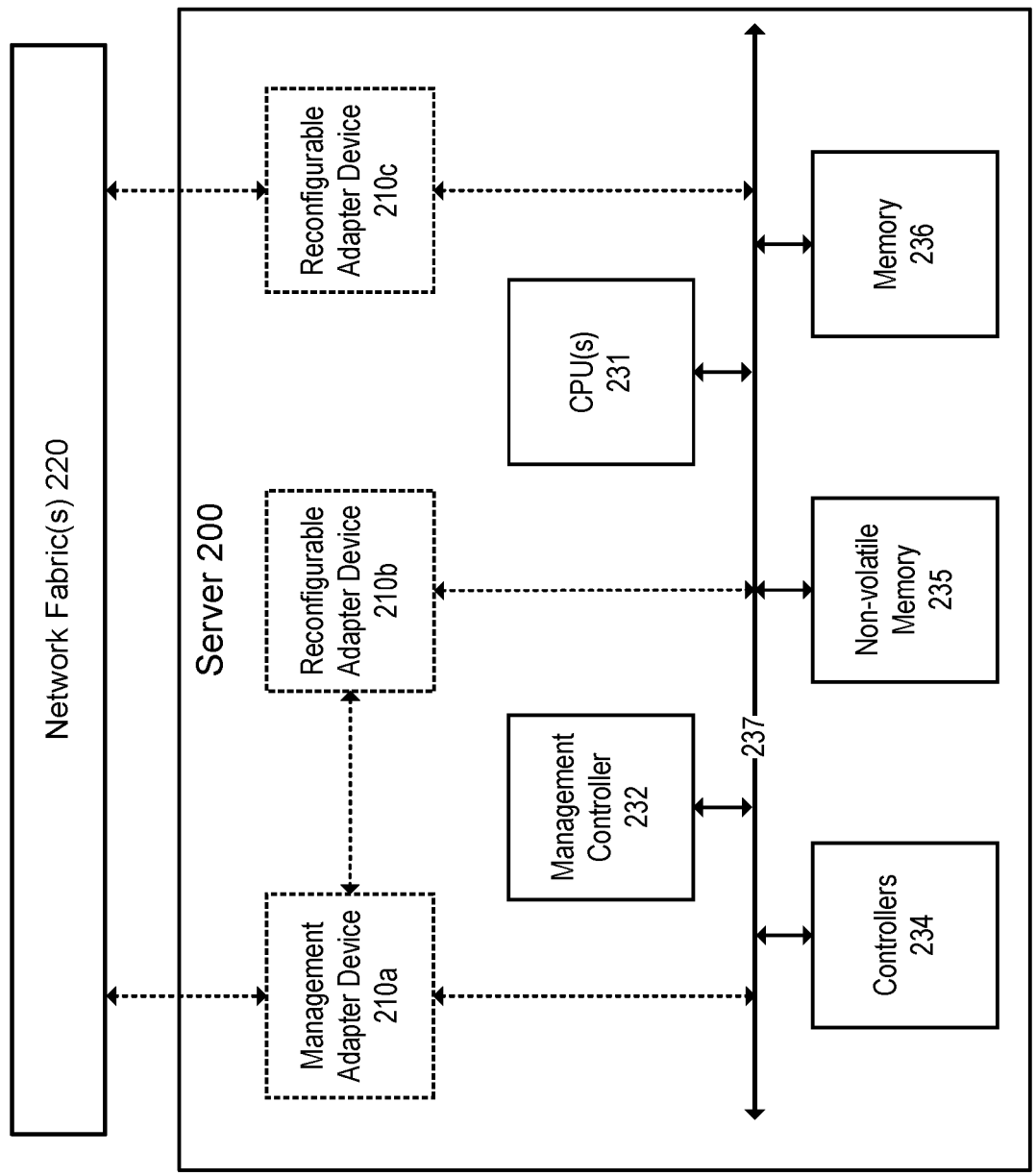
FIG. 2 illustrates an example server in a compute service system, according to certain aspects of the present disclosure.

FIG. 2 illustrates an example server 200 in a compute service system that can be used to perform embodiments described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present application. Still further, the illustrative components of server 200 may be logical in nature such that the physical implementation of one or more components can be varied or such that one or more of the logical components may be implemented in a virtualized manner. Additionally, one or more servers 200 may share one or more of the illustrated components, such as processors, graphical processing units, memory, and the like.

In an illustrative embodiment, server 200 may be associated with various hardware components, software components, and respective configurations that facilitate the execution of client applications, which will be described in detail below. In some implementations, server 200 may provide a multi-tenant platform to multiple clients through multiple adapter devices. For example, server 200 may provide web-based services such as computing, storage, analytics, web services, databases, applications, deployment services, website hosting, etc. to different clients. Specifically, in the example embodiment shown in FIG. 2, server 200 may include one or more adapter devices, such as adapter devices 210a, 210b, and 210c, which may be used to provide one or more instances, such as a server or one or more virtual machines, to one or more clients. Adapter devices 210a, 210b, and 210c may include identical or different hardware resources and may perform same or different functions for instance provision. One or more of adapter devices 210a, 210b, and 210c may be coupled to one or more network fabrics 220, which may be similar to network fabrics 110 described above with respect to FIG. 1. Communications between adapter devices 210a, 210b, and 210c and other components of server 200 may be performed using interfaces such as Peripheral Component Interconnect (PCI) interfaces, PCI Express (PCIe) interfaces, PCI Extended (PCI-X) interfaces, or any other suitable interfaces.

Server 200 may include a server, for example, an x86 server. Server 200 may include one or more Central Processing Units (CPUs) 231, such as one or more x86 processor cores. Examples of processors that may be included in CPUs 231 may include processors developed by ARM®, MIPS®, AMD®, Intel®, Qualcomm®, and the like. In some embodiments, CPUs 231 may also include GPUs. In some implementations, server 200 may include a management controller 232 for managing the operation of server 200 in accordance with, for example, the Intelligent Platform Management Interface ("IPMI"). Management controller 232 may include an embedded microcontroller that manages the interface between system management software and various components of server 200.

Server 200 may also include a non-volatile memory 235, which may include a System Basic Input/Output System (SBIOS) component. Non-volatile memory 235 may include non-transitory executable code, often referred to as firmware, which can be executed by CPUs 231 to cause components of server 200 to initialize and identify system devices, such as the video display card, keyboard and mouse, hard disk drive, optical disc drive, and other hardware. Non-volatile memory 235 may also store boot loader software that may be utilized to boot server 200. For example, in one embodiment, non-volatile memory 235 may include executable code that, when executed by a processor, causes server 200 to attempt to locate Preboot Execution Environment (PXE) boot software. Additionally, non-volatile memory 235 may include or take the benefit of a hardware latch that can restrict access to one or more aspects of non-volatile memory 235, such as controlling modifications or configurations of the executable code maintained in the non-volatile memory 235. Non-volatile memory 235 may be connected to (or in communication with) a number of components of server 200, such as CPUs 231, memory 236, and the like. In some embodiments, non-volatile memory 235 may include a flash memory or a read-only memory (ROM).

Memory 236 may include, for example, a random access memory (RAM), a DRAM, or a synchronous dynamic random-access memory (SDRAM), such as double data rate (DDR), DDR2, DDR3, or DDR4 SDRAM. In some embodiments, memory 236 may include several levels of cache hierarchy, such as Level 1 (L1) caches, Level 2 (L2) caches, Level 3 (L3), or last level caches. In some cases, some or all of memory 236 may be internal to server 200, while in other cases some or all of memory 236 may be external to server 200. Memory 236 may store an operating system comprising executable instructions that, when executed by CPUs 231, provide the execution environment for executing client applications. Memory 236 may also store and maintain data structures and, for example, routing tables. In some implementations, memory 236 may store profiles describing a hardware and/or software configuration for a compute system. In some implementations, memory 236 may store one or more descriptions of operating parameters for a compute system.

Server 200 may include one or more controllers 234 for managing internal or peripheral devices (not shown) of server 200, such as hard drives or other forms of memory. One example of controllers 234 may be a Serial Advanced Technology Attachment (SATA) hard drive controller.

One or more of the components of server 200 may be in communication with each other over a communication channel 237. Communication channel 237 may include one or more buses, meshes, matrices, fabrics, a combination of these communication channels, or some other suitable communication channels. For example, communication channel 237 may correspond to a shared bus (e.g., a front side bus, a memory bus), a point-to-point bus such as a PCI or PCIe bus, etc., in which the components of server 200 communicate. Other types of communication channels, communication media, communication buses or communication protocols (e.g., the Ethernet communication protocol) may also be utilized. Although communication channel 237 in FIG. 2 is shown as connecting all components of server 200, it should be appreciated that a communication channel in accordance with some embodiments may connect any subset of the components and/or other components. For example, a communication channel may connect a PCIe device to a CPU via a north bridge or host bridge. Adapter devices 210a, 210b, and 210c may also be coupled to communication channel 237 and communicate with other components of server 200 through communication channel 237.

Server 200 may also include additional components (not shown) that are in communication with one or more of the illustrative components of server 200, such as one or more controllers 234. The additional components may include one or more peripheral devices, such as hard disks or other storage devices, or external GPUs.

Adapter devices 210a, 210b, and 210c (collectively adapter devices 210) may be coupled to server 200 using, for example, a plug-in card or soldered to the motherboard of server 200. Adapter devices 210 may provide various services, such as traffic monitoring, traffic shaping, computing, billing, security management, or encryption, etc. Adapter devices 210 may provide physical and virtual services to server 200 and/or virtual processes running on server 200. In various embodiments, adapter devices 210 may include various components that input and/or output data along communication channel 237. In one aspect, adapter devices 210 may communicate as a standard bridge component for facilitating access between various physical and emulated components and communication channel 237. In another aspect, adapter devices 210 may include embedded microprocessors to allow the adapter device to execute computer executable instructions related to the implementation of management functions, or to execute other computer executable instructions related to client applications. In some embodiments, adapter devices 210 may be implemented using multiple discrete hardware elements, such as multiple cards, multiple integrated circuits, or other devices. In some embodiments, adapter devices 210 may be attached externally to server 200. In some embodiments, adapter devices 210 may be integrated into server 200.

As described above, adapter devices 210 may include identical or different hardware resources and may perform same or different functions. For example, in some embodiments, adapter devices 210 may include at least one management adapter device, such as management adapter device 210a, and one or more reconfigurable adapter devices, such as adapter devices 210b and 210c. Management adapter device 210a may be connected to network fabrics 220 and may receive provisioning request from a management service, such as management service 120 of FIG. 1. Management adapter device 210a may then reconfigure reconfigurable adapter devices 210b and/or 210c based on the provisioning request. In various embodiments, reconfigurable adapter devices 210b and 210c may include reconfigurable hardware resources such that they can be dynamically configured into different hardware configurations or to provide different hardware functionalities. For example, reconfigurable adapter devices 210b and 210c may be reconfigured based on a client's specific request and provided to the client. Thus, from the client's point of view, a system with customized hardware/software functions is provided even though the underlying hardware resources are fixed. In some embodiments, reconfigurable adapter devices 210b and 210c may be dynamically reconfigured to implement, in combination with other components of server 200, different hardware functions, which, from the client's point of view, may be detaching or attaching different hardware resources. In some cases, a management service may estimate the need of instances with a specific hardware and/or software configuration during a certain time period, select corresponding number of servers, and send request to the selected servers for configuring the selected servers according to the hardware/software configuration before a client requests one such instance.

In some implementations, a reconfigurable adapter device, such as reconfigurable adapter device 210b, may not be directly connected to a network and may be controlled by a management adapter device, such as management adapter device 210a. In some implementations, a reconfigurable adapter device, such as reconfigurable adapter device 210c, may be connected to network fabric(s) 220 such that it may use remote resources, such as remote storage or remote GPUs. In some implementations, reconfigurable adapter device 210c may receive provisioning request directly from the management service and a management adapter device may not be needed.

As such, in some implementations, a server may include management adapter device 210a and reconfigurable adapter device 210b. In some implementations, a server may include management adapter device 210a and reconfigurable adapter device 210c. In some implementations, a server may only include reconfigurable adapter device 210c, which may also function as a management adapter device. In some implementations, a server may include management adapter device 210a and reconfigurable adapter devices 210b and 210c.

Figure 3:
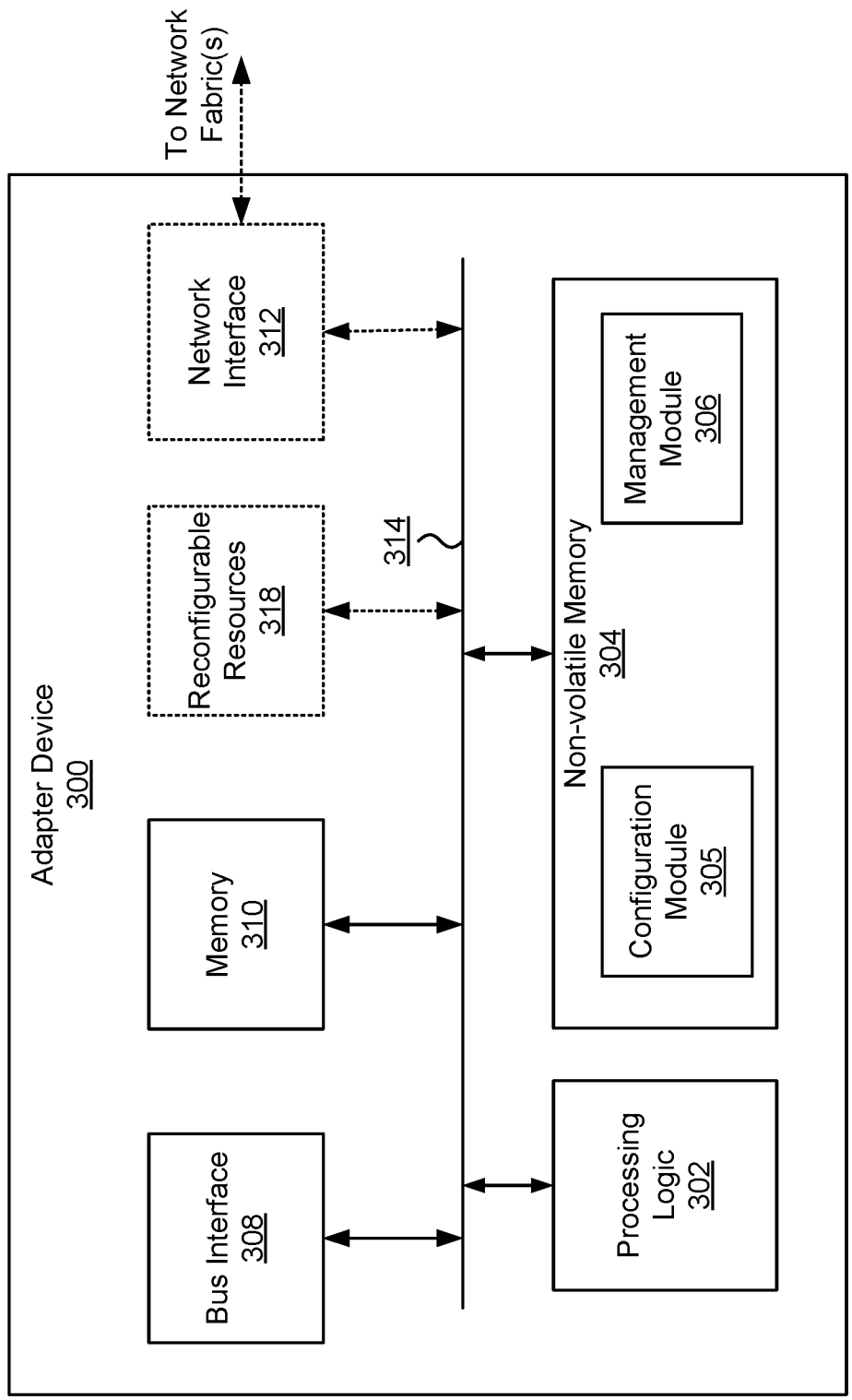
FIG. 3 illustrates a simplified block diagram of an example adapter device, according to certain aspects of the present disclosure.

FIG. 3 illustrates a simplified block diagram of an example adapter device 300, according to certain aspects of the present disclosure. Adapter device 300 may be used as a management adapter device or a reconfigurable adapter device as described above. Adapter device 300 may be implemented in hardware and include software to provide instances to client, in combination with other components of a server, such as server 200 of FIG. 2. Functionalities and/or components of adapter device 300 may be used without limitation with other embodiments disclosed elsewhere in this disclosure.

In one example, adapter device 300 may include a processing logic 302, a bus interface module 308, memory 310, non-volatile memory 304, a network interface 312, and reconfigurable resources 318. These modules may be hardware modules, software modules, or a combination of hardware and software. In certain instances, modules may be interchangeably used with devices, components, or engines, without deviating from the scope of the disclosure. Adapter device 300 may include additional modules not illustrated here. In some implementations, adapter device 300 may include fewer modules. For example, when adapter device 300 is used as a management adapter device, reconfigurable resource 318 may be optional. For example, the reconfigurable resource 318 can in some embodiments be one or more emulators. In this example, the emulators could be loaded into memory and executed by processing logic 302, and the emulators can run in response to input signals received on the pins of the reconfigurable adapter device 300; determine the appropriate response based on the input signals; and respond accordingly to emulate a specific type of hardware device. In the same or other embodiments, the reconfigurable resource could be hardware, such as FPGAs or a special-purpose co-processor, such as a crypto-processor or GPU. In some implementations, one or more of the modules may be combined into one module. One or more of the modules may be in communication with each other over a communication channel 314.

Communication channel 314 may include one or more buses, meshes, matrices, fabrics, a combination of these communication channels, or some other suitable communication channels. As communication channel 237 of FIG. 2, communication channel 314 may correspond to a shared bus (e.g., a front side bus, a memory bus), a point-to-point bus such as a PCI or PCI Express bus, etc., in which the modules of adapter device 300 communicate. Other types of communication channels, communication media, communication buses or communication protocols (e.g., the Ethernet communication protocol) may also be utilized. Although communication channel 314 in FIG. 3 is shown as connecting all of components 302-318, it should be appreciated that a communication channel in accordance with some embodiments may connect any subset of the components 302-318 and/or other components.

Processing logic 302 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in processing logic 302 may include processors developed by ARM®, MIPS®, AMD®, Intel®, Qualcomm®, and the like. In certain implementations, processing logic 302 may include multiple processing cores, wherein each processing core may be configured to execute instructions independent of other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as, for example, busses, level 1 (L1) caches, and/or level 2 (L2) caches. The instructions executed by processing logic 302 may be stored on a computer-readable storage medium, for example, in the form of a computer program. The computer-readable storage medium may be non-transitory. In some cases, the computer-readable storage medium may be part of memory 310 or non-volatile memory 304.

In implementations where adapter device 300 is used as a reconfigurable adapter device, processing logic 302 may, for example, execute emulation software to emulate the desired hardware functions or execute firmware to configure reconfigurable resources 318. In implementations where adapter device 300 is used as a management adapter device, processing logic 302 may control the configuration of a reconfigurable adapter device, such as, for example, loading appropriate code (e.g., emulation software), configuration file, or firmware on the reconfigurable adapter device. In some implementations, a management adapter device may also be used for security management for the corresponding server.

Memory 310 may include either volatile or non-volatile, or both volatile and non-volatile types of memory. Memory 310 may, for example, include Random Access Memory (RAM), ROM, Electrically Erasable Programmable Read-Only Memory (EEPROM), flash memory, magnetic memory, optical memory, solid state memory, and/or some other suitable storage media. In some cases, some or all of memory 310 may be internal to adapter device 300, while in other cases, some or all of memory 310 may be external to adapter device 300. Memory 310 may store an operating system comprising executable instructions that, when executed by processing logic 302, provide the execution environment for executing instructions providing the functionality for adapter device 300. Memory 310 may also store emulation software that can be run by processing logic 302. Memory 310 may also store and maintain data structures and, for example, routing tables for facilitating the functionality of adapter device 300. In some implementations, memory 310 may store profiles describing a hardware and/or software configuration for a computing system. In some implementations, memory 310 may store one or more descriptions of operating parameters for a computing system.

Non-volatile memory 304 may be a part of memory 310 or may be separate from memory 310. Non-volatile memory 304 may include a Basic Input/Output System (BIOS) component. Non-volatile memory 304 may include firmware that can be executed by, for example, processing logic 302, to cause components of adapter device 300 to initialize and identify modules, such as processing logic 302 and memory 310, and other devices of the adapter device that may not be shown in FIG. 3, such as a video display card, keyboard and mouse, hard disk drive, optical disc drive and other hardware. Non-volatile memory 304 may include or locate boot loader software that will be utilized to boot adapter device 300. For example, in one embodiment, non-volatile memory 304 may include executable code that, when executed by a processor (e.g., processing logic 302), causes adapter device 300 to attempt to locate the PXE boot software. Additionally, non-volatile memory 304 may include firmware that may be used to reconfigure and boot reconfigurable resources 318 for performing different hardware functionalities based on provisioning requests. In some embodiments, non-volatile memory 304 may include a flash memory. In some implementations, non-volatile memory 304 may include emulation software that may be loaded in memory 310 for configuring adapter device 300 according to the desired hardware function (i.e., emulating the desired hardware function using the hardware resource on adapter device 300).

In some implementations, non-volatile memory 304 may include or store a configuration module 305 and/or a management module 306. Configuration module 305 may include one or more configuration registers. Configuration registers may control the operations of adapter device 300. In some implementations, one or more bits in the configuration registers can represent certain capabilities of adapter device 300. Configuration registers may be programmed by instructions executing in processing logic 302, and/or by an external entity, such as a server, an operating system executing on a server, a management adapter device, and/or a remote device. Configuration module 305 may include software that may be executed by processing logic 302 to control the operations of adapter device 300. For example, in some implementations, configuration module 305 may be configured to enable or disable one or more operations of adapter device 300 based on instructions from processing logic 302 and/or external entities, such as resetting adapter device 300 or holding adapter device 300 in reset.

In some implementations, management module 306 may be configured to manage different components of adapter device 300. In some cases, management module 306 may configure one or more bits in one or more configuration registers at power up, to enable or disable certain capabilities of adapter device 300. In certain implementations, management module 306 may use processing resources from processing logic 302. Management module 306 may also be used to configure and control the operations of reconfigurable resources 318. In some implementations, configuration module 305 and management module 306 may be a same module in non-volatile memory 304.

Bus interface module 308 may enable communication with external entities, such as a server and/or other components in a computing system, over an external communication medium. Bus interface module 308 may include a physical interface for connecting to a cable, socket, port, or other connection to the external communication medium. Bus interface module 308 may further include hardware and/or software to manage incoming and outgoing transactions. Bus interface module 308 may implement a local bus protocol, such as PCI based protocols, Non-Volatile Memory Express (NVMe), Advanced Host Controller Interface (AHCI), Small Computer System Interface (SCSI), Serial Attached SCSI (SAS), SATA, Parallel Advanced Technology Attachment (PATA), QuickPath Interconnect (QPI), UltraPath Interconnect (UPI), some other standard bus protocols, or proprietary bus protocols. Bus interface module 308 may include the physical layer for any of these bus protocols, including a connector, power management, and error handling, among other things. In some implementations, adapter device 300 may include multiple bus interface modules for communicating with multiple external entities. These multiple bus interface modules may implement the same local bus protocol, different local bus protocols, or a combination of the same and different bus protocols.

In some implementations, network interface 312 may include hardware and/or software configured to implement a protocol for communicating with externally connected devices or functions. For example, network interface 312 may include hardware and/or software for communicating with one or more network fabrics, such as network fabrics 110 described above with respect to FIG. 1. Network interface 312 may, for example, include physical connectors or physical network ports for wired connection to a network, and/or antennas for wireless communication to a network. Network interface 312 may further include hardware and/or software configured to implement a network protocol stack. Network interface 312 may communicate with a network using a network protocol, such as, for example, TCP/IP, InfiniBand, Remote Direct Memory Access (RDMA) over Converged Ethernet (RoCE), Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, adapter device 300 may include multiple network interface modules, each configured to communicate with a different network, such as a wired Ethernet network, a wireless 802.11 network, a cellular network, or an InfiniBand network, etc.

In various embodiments, reconfigurable resource 318 may include a plurality of resources that may be reconfigured dynamically in response to, for example, an instance launch request. For example, in some embodiments, reconfigurable resources 318 may include reconfigurable processing cores, reconfigurable memory resources, reconfigurable I/O resources, reconfigurable network links, and reconfigurable storage resources, as described in detail below with respect to FIG. 4.

In some implementations, adapter device 300 may be a PCI-based device. In these implementations, adapter device 300 may include a PCI interface for communicating with a server. The term "PCI" may be used to describe any protocol in the PCI family of bus protocols, including the original PCI standard, AGP, PCIe, and PCI-X. The PCI protocols are standard bus protocols for connecting local peripheral devices to servers. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, bus interface module 308 may implement NVMe, and adapter device 300 may be connected to a computing system using a PCIe interface.

Although not shown in FIG. 3, adapter device 300 may include other components or modules, such as mass storage controllers, network controllers, display controllers, memory controllers, serial bus controllers, wireless controllers, and encryption and decryption controllers, among others. In some embodiments, various components and modules of adapter device 300 described above, such as processing logic 302, bus interface module 308, and network interface 312, may be implemented as one or more discrete components, as one or more system-on-chip (SoC), as one or more ASICs, as one or more NPUs, as one or more FPGAs, or any combination thereof.

Figure 4:
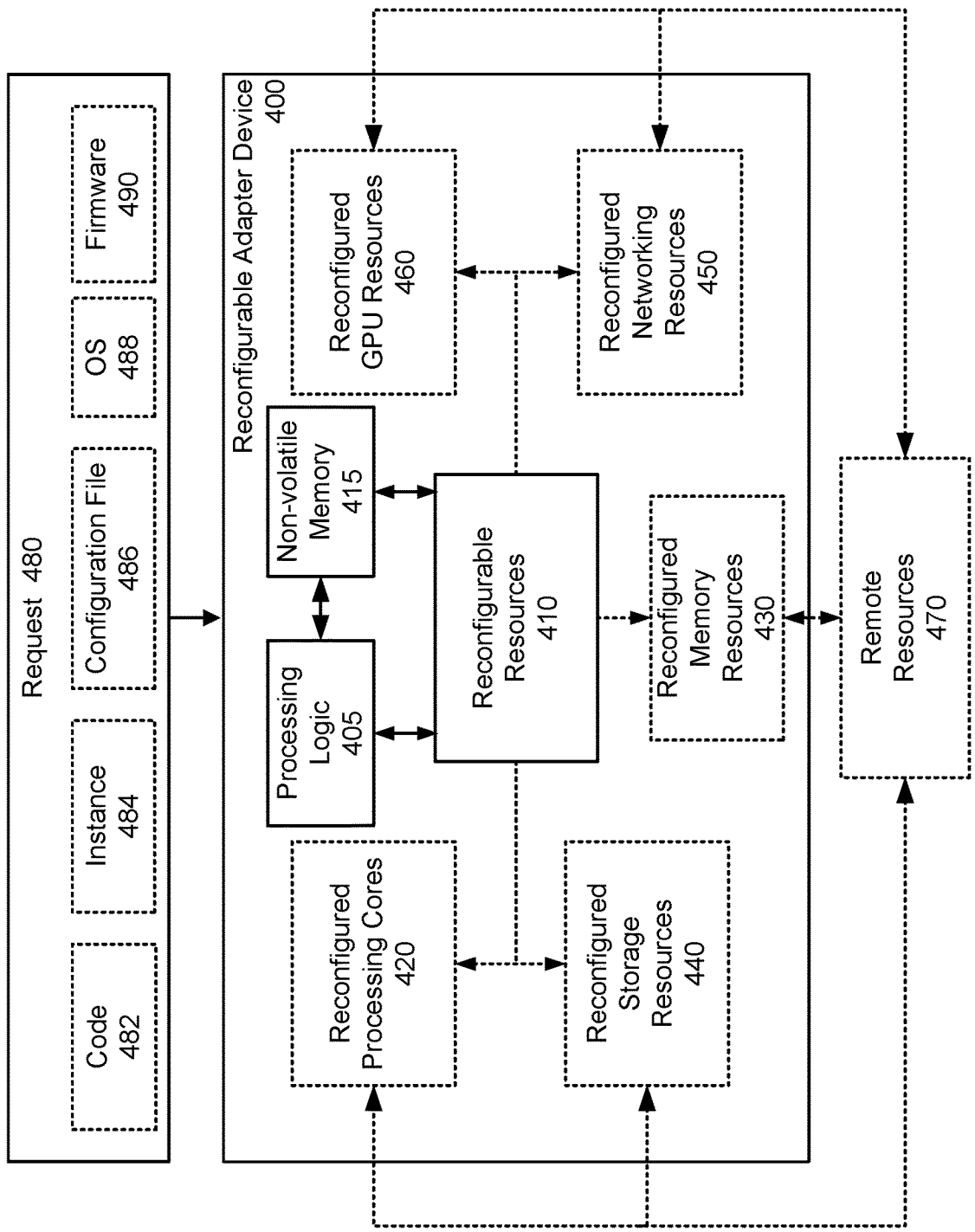
FIG. 4 illustrates a simplified block diagram of an example reconfigurable adapter device, according to certain aspects of the present disclosure.

FIG. 4 illustrates a simplified block diagram of an example reconfigurable adapter device 400, according to certain aspects of the present disclosure. Reconfigurable adapter device 400 may include reconfigurable resources 410, a processing logic 405, and non-volatile memory 415. Many other components of reconfigurable adapter device 400, such as the ones shown in FIG. 3, are omitted in order not to obscure the features being described herein.

Reconfigurable resources 410 may be an example of reconfigurable resources 318 of FIG. 3. Reconfigurable resources 410 may include hardware resources that can be reconfigured according to different hardware configurations for performing different hardware functions and enabling reconfigurable adapter device 400 to provide, in combination with one or more servers, any of a plurality of types of instances to a client. The plurality of types of instances may correspond to various different hardware configurations or hardware functions, such as, for example, reconfigured processing cores 420, reconfigured memory resources 430, reconfigured storage resources 440, reconfigured network resources 450, and reconfigured GPU resources 460.

The different hardware functions of reconfigurable adapter device 400 may be implemented in various ways. For example, in some embodiments, the hardware functions of reconfigurable adapter device 400 may be emulated by reconfigurable resources 410 via emulation software. The emulation software may enable reconfigurable resources 410 to behave like a desired hardware resource. For example, in some embodiments, the emulation software may provide an interface between reconfigurable resources 410 and other hardware resources on the device or different server, such that, from the other hardware resources' point of view, reconfigurable resources 410 may appear to be the desired hardware.

In some embodiments, at least some of the requested hardware functions may be performed by physically configured hardware resources, such as reprogrammable logic (e.g., FPGA, programmable array logic (PAL), or complex programmable logic device (CPLD)) in reconfigurable resources 410. In some embodiments, at least some of the requested hardware functions, such as GPUs and SSDs, may be performed by hardware resources on a remote server, where reconfigurable resources 410 may be reconfigured as an interface between other hardware resources on the server and the remote server such that other hardware resources on the server may communicate with reconfigurable resources 410 as if they are directly communicating with the desired hardware resources, such as GPUs or SSDs.

In some embodiments, reconfigurable resources 410 may be reconfigured into reconfigured processing cores 420, which may include a plurality of processing cores, such as 2, 4, 8, 16, 32, 64, or more processing cores. The processing cores may include, for example, a 2-core processor, a 4-core processor, or an 8-core processor. In some embodiments, reconfigurable resources 410 may be configured to include L1 and/or L2 caches, which may be shared between multiple cores of a processor. For example, each L1 and/or L2 cache (e.g., 4-MByte cache) may be integrated with one multi-core processor (e.g., 2-core processor). In some instances, the L1 cache may be used as a primary cache and the L2 cache may be used as a secondary cache. For example, in some embodiments, an emulation software may interpret workload that is designed to be performed on an x86 processor into instructions that can be executed by reconfigurable resources 410 even though reconfigurable resources 410 may not physically include an x86 processor.

In some embodiments, reconfigurable resources 410 may be reconfigured into reconfigured memory resources 430, which may include memory controllers and/or associated memory. For example, reconfigured memory resources 430 may include DDR, DDR2, DDR3, or DDR4 memory, and corresponding memory controllers. In some embodiments, reconfigured memory resources 430 may be exposed and accessible to a processor, such as CPU 231, as local memory off of a non-uniform memory architecture (NUMA) node. For example, an emulation software executing on the reconfigurable adapter device 400 by processing logic 405 and/or reconfigurable resources 410 may expose a PCI based interface for accessing memory (e.g., as Intel® QuickPath Interconnect or UltraPath Interconnect). Reconfigured memory resources 430 may also include any suitable controller that may be used to manage the access to external memory, such that the external memory may appear to be local memory or a cache to other hardware resources on the server. For example, in some embodiments, reconfigured memory resources 430 may maintain a page table that can map local memory pages to memory pages on external memory.

In some embodiments, reconfigurable resources 410 may be reconfigured into reconfigured storage resources 440, which may include an interface for connecting to external mass storage devices such as hard drives, optical drives, etc. For example, the interface may be based on SATA. In some embodiments, reconfigured storage resources 440 may include one or more interfaces to SSDs that can support very high random I/O performance at a low cost. For example, in some embodiments, reconfigured storage resources 440 may include a NVMe interface for accessing non-volatile storage media attached via PCIe bus and software that enables the adapter device to respond as a NVMe device to input signals received from the CPU.

In some embodiments, reconfigurable resources 410 may be reconfigured into reconfigured network resources 450, which may include, for example, links for networking or data storage, such as RDMA-capable network links for high-throughput, low-latency networking. For example, reconfigured network resources 450 may include a network adapter that supports Virtual Interface Architecture, RDMA over Converged Ethernet (RoCE), InfiniBand, or internet wide area RDMA protocol (iWARP). In some embodiments, reconfigurable resources 410 may include a network link that can be reconfigured as a RDMA link or a different network link described here. In some embodiments, reconfigured network resources 450 may include different types of accelerators such as hardware accelerators, various pipelines, crypto engines, etc. For example, the crypto engines may execute cryptographic functions in hardware, thus reducing software overhead and accelerating the execution of decryption, encryption, and authentication functions related to networking.

In some embodiments, reconfigurable resources 410 may be reconfigured into reconfigured GPU resources 460, which may include a plurality of GPU cores. In many applications requiring GPUs, such as a Computer-Aided Design (CAD) application, many workloads may only require 2-dimensional (2-D) rendering. Such workloads may be performed by reconfigured GPU resources 460, reconfigurable processing cores 420, processing logic 405, or CPU(s) on a server, such as CPU(s) 231 of FIG. 2. Workloads that may require true 3-D rending may be offload to a server that includes high performance GPU cores. In some embodiments, reconfigured GPU resources 460 may be capable of at least some true 3-D rendering. For example, in some embodiments, an emulation software may offload or distribute workload that is designed to operate on a GPU to remote GPU resources coupled to reconfigurable resources 410 through a network, or convert the workload into workload that can be executed by reconfigurable resources 410, even though reconfigurable resources 410 may not physically include a GPU.

In various embodiments, reconfigurable resources 410 may be reconfigured to include any combination of the above described hardware configurations/functions. Processing logic 405 may be configured to dynamically configuring reconfigurable resources 410 based on the requirement of the requested instance. In some embodiments, processing logic 405 may reconfigure reconfigurable resources 410 during boot-up. For example, processing logic 405 may be configured to load firmware or software (e.g., emulation software and/or a configuration file) that corresponds to a user requested instance for performing a hardware and/or software function. The firmware or software may be loaded from, for example, non-volatile memory 415 or non-volatile memory on a management adapter device or other devices. In some embodiments, processing logic 405 may load new firmware or new software (including new configuration file or new emulation software) corresponding to a new type of instance or a new configuration/function of adapter device 400 into non-volatile memory 415. Reconfigurable adapter device 400 and/or reconfigurable resources 410 may then reboot using the loaded firmware or run the loaded emulation software to reconfigure the reconfigurable adapter device and, therefore, the server. Non-volatile memory 415 may include any non-volatile memory as described above with respect to non-volatile memory 235 and non-volatile memory 304. For example, non-volatile memory 415 may include a flash memory or ROM.

In various embodiments, reconfigurable adapter device 400 may receive a request 480, for example, from a management adapter device or from a management service (e.g., management service 120 of FIG. 1) directly if the reconfigurable adapter device can also function as a management adapter device. Request 480 may include, for example, an instance 484 selected from a plurality of types of instances predefined by the compute service provider, executable code 482 (such as emulation software or custom code), a configuration file 486, an operating system 488 to run on the server, or firmware 490. Non-volatile memory 415 may include firmware corresponding to one or more of the plurality of types of instances predefined by the compute service provider. For example, the firmware or emulation software corresponding to one or more of the plurality of types of instances may be preloaded into non-volatile memory 415 based on, for example, a default or a predicted type of instance to be provisioned by an adapter device and the corresponding server. In some cases, a client may request a custom instance that is not predefined by the compute service provider. In such cases, request 480 may include custom code in code 482 (e.g., a custom firmware) or a user-defined configuration file in configuration file 486, which may be used to configure reconfigurable resources 410, adapter device 400, and/or the corresponding server. In some cases, request 480 may include a user provided operating system or hypervisor in operating system 488.

As also shown in FIG. 4, adapter device 400 may be connected to remote resources 470 through, for example, network fabrics 110 of FIG. 1 or network fabrics 220 of FIG. 2, and optionally, adapter devices associated with remote resources 470. Remote resources 470 may include one or more servers that include, for example, GPUs, memory devices, storage devices, processing cores, or network resources. Reconfigurable resources 410 may be used in combination with remote resources 470 to provide the instance requested by a client. For example, in some cases, code 482 may include instructions executable by reconfigurable resources 410 to communicate with remote resources 470. In some cases, configuration file 486 may include a configuration file to configure reconfigurable resources 410 for communicating with remote resources 470.

Figure 5:
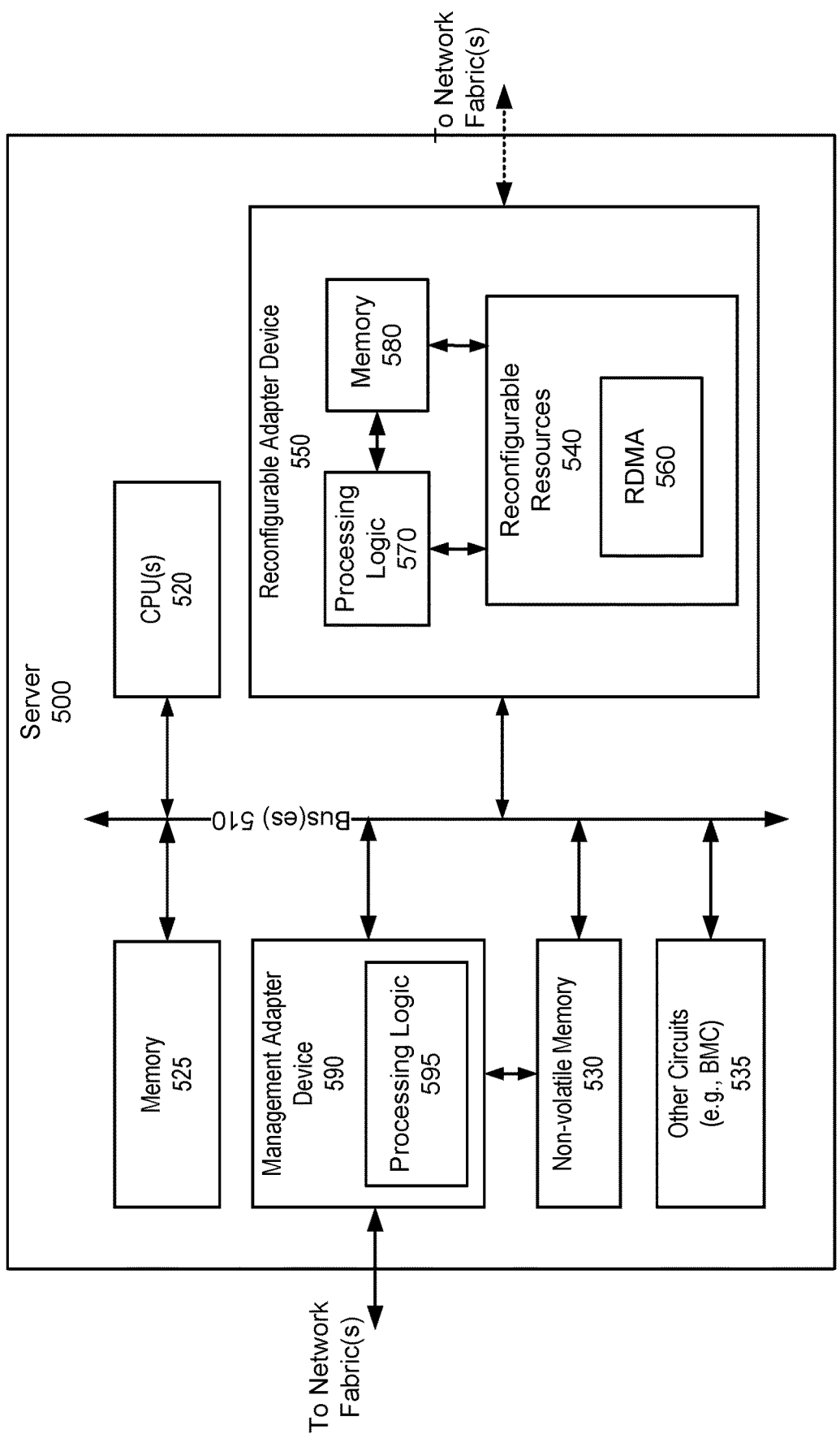
FIG. 5 illustrates a simplified block diagram of an example server in a compute service system, according to certain aspects of the present disclosure.

FIG. 5 illustrates a simplified block diagram of an example server 500 in a compute service system, according to certain aspects of the present disclosure. Server 500 may include a reconfigurable adapter device 550 coupled to one or more buses 510 using an interface, such as a PCIe interface or any other suitable interface as described above with respect to communication channel 237 of FIG. 2. As shown in FIG. 5, reconfigurable adapter device 550 may include reconfigurable resources 540, a processing logic 570, and memory 580, as described above with respect to FIG. 4. Server 500 may also include CPU(s) 520, memory 525, and non-volatile memory 530, as described above with respect to FIG. 2. Server 500 may further include a management adapter device 590 and other circuits 535, such as a baseboard management controller (BMC). Some components of adapter devices 550 and 590, such as some modules shown in FIGS. 3 and 4, and some components of server 500, such as some components shown in FIG. 2, are omitted in order not to obscure the features being described herein with respect to FIG. 5. Server 500 may be coupled to one or more network fabrics, such as network fabrics 110 of FIG. 1, through management adapter device 590 and/or reconfigurable adapter device 550. In the example server 500 shown in FIG. 5, reconfigurable resources 540 may be reconfigured to include an RDMA adapter 560.

In some embodiments, when a provisioning request is received by management adapter device 590 of server 500, a processing logic 595 of management adapter device 590 may select a personality from a plurality of possible personalities for reconfigurable resources 540 of reconfigurable adapter device 550, and configure reconfigurable resources 540 according to the selected personality. Each personality of the plurality of personalities may correspond to a different hardware configuration or function. For example, the selected personality may include an RDMA link. Processing logic 595 may configure reconfigurable resources 540 by loading, via processing logic 570 on reconfigurable adapter device 550, firmware or emulation software corresponding to the selected personality into memory 580, or enable a portion of memory 580 that stores the corresponding firmware or emulation software. For example, the firmware or emulation software that may be used to turn reconfigurable resources 540 into an RDMA adapter may be loaded into or enabled in memory 580. Processing logic 570 may then initialize reconfigurable resources 540 and/or reconfigurable adapter device 550 using the loaded or enabled firmware, or run emulation software in memory 580 to configure reconfigurable resources 540 of reconfigurable adapter device 550 to include, for example, RDMA adapter 560.

After reconfigurable adapter device 550 is booted or initialized and reconfigurable resources 540 are configured according to the selected personality, adapter device 590 may initiate rebooting of server 500 using firmware stored in non-volatile memory 530. As described in detail below, in some embodiments, server 500 may be rebooted as a bare-metal system, and a client may load a customer operating system (or a customer hypervisor if desired) to server 500, for example, through management adapter device 590. In some embodiments, rebooting server 500 may include loading a compute service provider provided hypervisor or operating system onto server 500. During the booting process, CPU(s) 520 may enumerate the hardware resources on server 500, during which reconfigurable adapter device 550 may report or otherwise identify itself as the desired hardware that has been configured to, such as a RDMA adapter, a GPU, a memory control, a processor, etc. For example, in one implementation, the vender/device IDs of a desired hardware that has been emulated may be reported to the CPU 520 during the enumeration process.

In some embodiments, during the booting process, management adapter device 590 may perform security management to maintain a secure execution environment on server 500. For example, during the booting process, management adapter device 590 may control the access to non-volatile memory 530 by various circuits on server 500 and control the communications between various circuits on server 500. Management adapter device 590 may first verify or update the firmware in non-volatile memory 530 while holding other circuits on server 500 in reset. For example, the management adapter device can validate the firmware on the reconfigurable adapter device. After checking that the firmware is valid, the reconfigurable adapter device can be brought out of reset and the management adapter device can send a request to the adapter device to cause the adapter device to load an emulator to emulate a type of device. After the firmware verification and/or update, management adapter device 590 may release CPU(s) 520 from reset, and the CPU may start to boot using the firmware in non-volatile memory 530. The CPU may also perform memory scrubbing to clean up the memory using verified firmware stored in non-volatile memory 530 or an option ROM on management adapter device 590. Management adapter device 590 may release other circuits or devices, such as the BMC, from reset such that these circuit may be booted using the verified firmware in non-volatile memory 530. After the circuits on server are booted using the corresponding firmware, management adapter device 590 may limit the access to non-volatile memory 530 by the circuits or devices. Management adapter device 590 may also restrict communications between at least some of the circuits or devices. These circuits or devices may be enumerated and the CPU may check the enumerated (or inventoried) circuits or devices to ensure that they are functioning properly. For example, the circuits may report or otherwise identify themselves as being certain devices, for example, using an appropriate vendor ID and/or device ID. CPU(s) 520 may then load an operating system or a hypervisor on server 500, and the operating system or hypervisor may perform another hardware verification of the enumerated circuits or devices. In some embodiments, the circuits or devices on server 500 may only be enumerated and verified once. In some embodiments, reconfigurable resources 540 and/or reconfigurable adapter device 550 may be configured as a plug-n-play device, and thus no rebooting may be needed.

Figure 6:
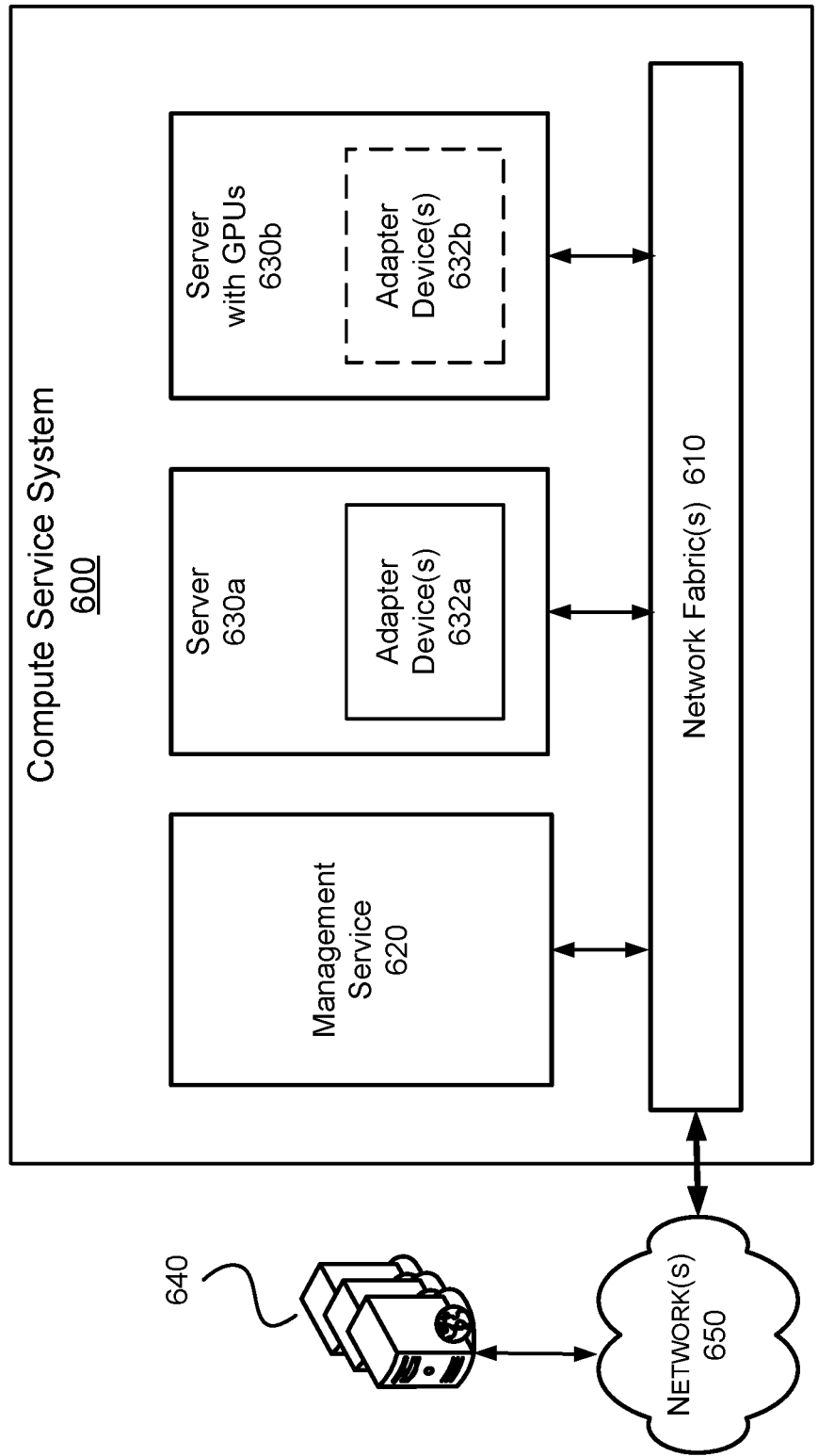
FIG. 6 illustrates an example compute service system, according to certain aspects of the present disclosure.

FIG. 6 illustrates an example compute service system 600 in a web-based service environment, according to certain aspects of the present disclosure. In the web-based service environment, a user device 640 may request, for example, an instance with one or more GPUs that include hundreds or thousands of parallel processing cores, which may not be included in some servers. The requested instance may also include other general functions that can be provided by a server. The user request may be sent to a management service 620 in compute service system 600 through one or more networks 650 and one or more network fabrics 610 in compute service system 600 that is connected to network(s) 650. User device 640, network(s) 650, and network fabric(s) 610 may be similar to client device 140, network(s) 150, and network fabric(s) 110 of FIG. 1 as described above.

Upon receiving the user request, management service 620 may select a server 630*a* that can be used to provide at least some functions of the requested instance. Management service 620 may also select a server that includes GPUs, such as server 630*b*, to provision the requested instance in combination with server 630*a*. Server 630*a* may include adapter device(s) 632*a*, which may be any adapter device as described above, for example, with respect to FIGS. 2-5, and may include one or more adapter devices, such as a management adapter device and/or one or more reconfigurable adapter devices. Server 630*b* may optionally include adapter device(s) 632*b*, which may be any adapter device as described above, for example, with respect to FIGS. 2-5, and may include one or more adapter devices, such as a management adapter device and/or one or more reconfigurable adapter devices. Server 630*b* may be configured to run a virtual machine for parallel data processing (e.g., 3-D graphic processing) using some resources of server 630*b* and/or adapter device(s) 632*b*. Server 630*b* may also be configured to use all resources of server 630*b* and adapter device(s) 632*b* for the requested instance. Server 630*a* may be reconfigured based on the requested instance by, for example, configuring reconfigurable resources on adapter device(s) 632*a* according to a personality corresponding to the requested instance, rebooting server 630*a*, and loading a desired operating system or hypervisor on server 630*a*. Adapter device(s) 632*a* and/or adapter device(s) 632*b* may be configured to coordinate with each other to provision the requested instance. For example, one of adapter device(s) 632*a* and adapter device(s) 632*b* may act as a master adapter device for the requested instance.

As described above, in many applications requiring GPUs, such as a CAD application, many workloads may only require 2-D rendering. Such workloads may be performed by server 630*a* having adapter device(s) 632*a*. Only workloads that may require true 3-D rending may be offload to server 630*b* that includes high performance GPU cores. In some embodiments, server 630*a* may be capable of at least some true 3-D rendering. In some embodiments, a master adapter device, such as adapter device(s) 632*a*, may be configured to handle the workload splitting and offloading.

Similar workload splitting and offloading scheme may be used for provisioning other types of instances. For example, in some cases, a user may request an instance with a large amount of memory space that may not be provided by a single server. In such cases, a tiered memory system may be provided by a compute service system. For example, local memory on a server may be used as the primary memory for workloads that require fast memory access, while memory on a remote server or a specialized memory device that has a large memory space may be used as the secondary memory for workloads that may have lower speed or latency requirement. Similar scheme may be used for instances that require a large storage space.

As another example, in some cases, a user may request an instance including a cluster of closely located servers. In such cases, management service 620 may select a cluster of servers that are close to each other, such that the networking latency could meet the user requirement. The selected servers may then be reconfigured accordingly. For example, each of the adapter devices associated with the selected servers may be reconfigured to include an RDMA link for communications between the cluster of servers.

Figure 7:
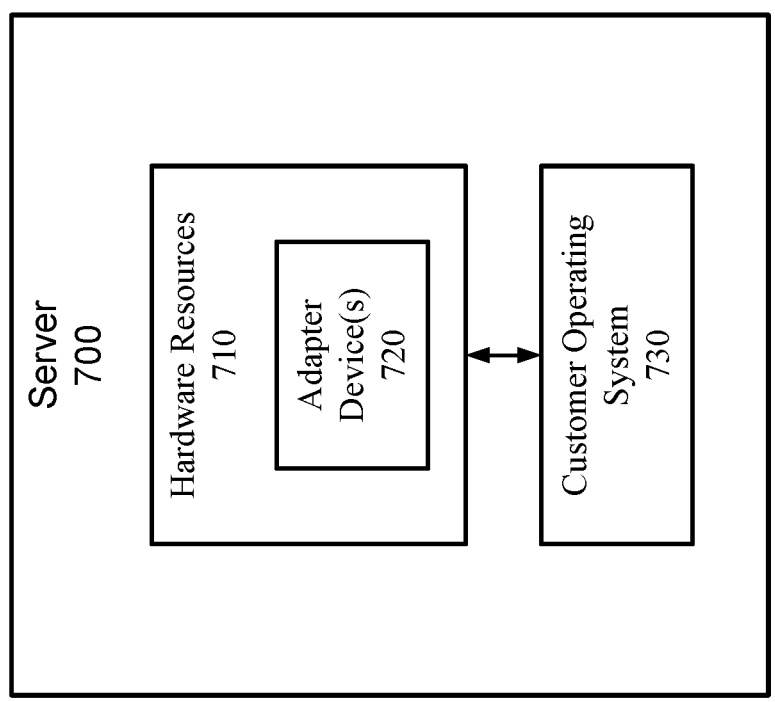
FIG. 7 illustrates an example server in a compute service system, according to certain aspects of the present disclosure.

FIG. 7 illustrates an example server 700 in a compute service system, according to certain aspects of the present disclosure. Server 700 may be a server that has been configured as a bare-metal system. Server 700 may include hardware resources 710 that include adapter device(s) 720, such as an adapter device with a PCIe interface or any other suitable interface. Adapter device(s) 720 may have been reconfigured to provide a particular type of predefined or custom instance to a client by configuring reconfigurable resources (e.g., reconfigurable resources 318, 410, or 540) on adapter device(s) 720 according to a predefined or custom personality corresponding to the particular type of instance, as described above.

Server 700 may include a customer operating system 730 running on hardware resources 710. Server 700 may be configured by rebooting using firmware stored in a non-volatile memory on server 700, such as non-volatile memory 235 or 530 described above. In some embodiments, during rebooting of server 700, certain extension firmware may be loaded, for example, from option ROM on adapter device 740, and/or a customer operating system, such as Microsoft Windows, Linux, or MacOS, may be loaded from, for example, a persistent storage device, such as a hard drive or an SSD. Server 700 may run the extension firmware to, for example, scrub data in cache or other volatile memory. Server 700 may continue the reboot process using the customer operating system. After the customer operating system is loaded through the booting process by a boot loader, the client can then run applications on the customer operating system to access and utilize hardware resources 710 on server 700.

Figure 8:
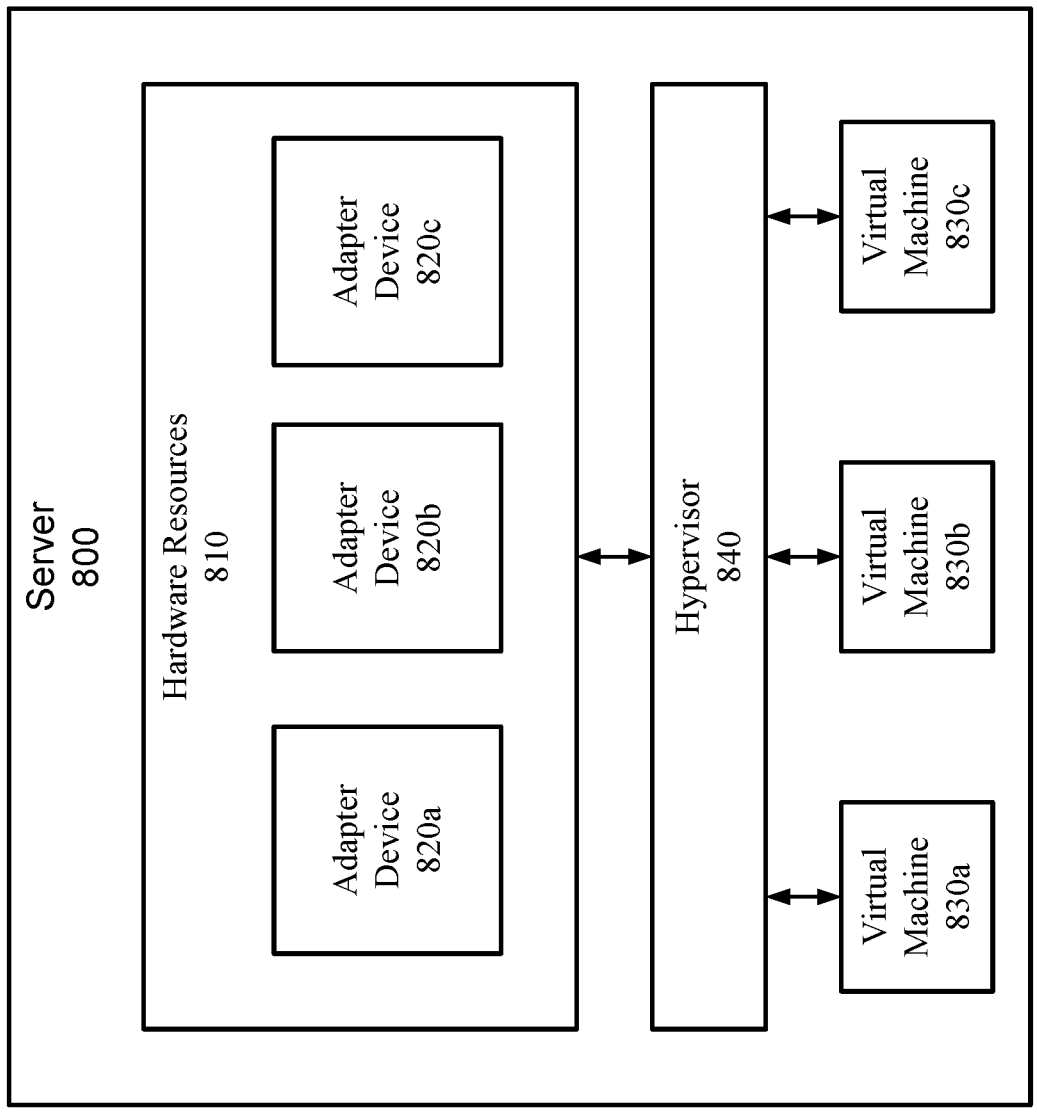
FIG. 8 illustrates an example server in a compute service system, according to certain aspects of the present disclosure.

FIG. 8 illustrates an example server 800 in a compute service system, according to certain aspects of the present disclosure. Server 800 may be a server that has been configured to run a hypervisor on underlying hardware resources, where different operating systems may run on the hypervisor for different virtual machines. Server 800 may include hardware resources 810 that includes one or more adapter devices, such as adapter devices 820*a*, 820*b*, and 820*c* (collectively adapter devices 820), where each adapter device may be used for a corresponding virtual machine.

As shown in FIG. 8, server 800 may execute a hypervisor 840 on underlying hardware resources 810. One or more processes, such as virtual machines 830*a*, 830*b*, 830*c* (collectively virtual machines 830) may be managed by hypervisor 840. Each virtual machine may be emulated by an adapter device 820 and may run a separate operating system.

In some embodiments, adapter devices 820 may be virtual adapter devices and may be emulated by a same card or SoC. Virtual machines 830 may be any suitable emulation of a computer system. Each virtual machine 830 may be in communication with an adapter device 820 or a virtual adapter device via a data path.

Virtual machines 830 running on server 800 may be managed by hypervisor 840. Hypervisor 840 may, for example, be configured to create, start, monitor, stop, and delete virtual machines 830. In addition, hypervisor 840 may be configured to communicate with adapter devices 820 such that adapter devices 820 may create or remove a virtual adapter device. Virtual machines 830 may be assigned priorities such that the transactions initiated by one virtual machine 830 (e.g., 830a) may take precedence over transactions initiated by another virtual machine 830 (e.g., 830b). In some embodiments, the priorities may only take effect when the resources of server 800 or adapter devices 820 are heavily occupied. Priorities may take the form of service level agreements. A service level agreement may, for example, indicate an amount of resource usage permitted for a virtual machine. For example, service level agreements may indicate that a virtual machine (e.g., 830c) may only be allowed a certain amount of network bandwidth, host memory, and/or adapter device usage.

Each adapter device 820 may have been reconfigured to provide a particular type of instance to a client by configuring reconfigurable resources (e.g., reconfigurable resources 318, 410, or 540) on each adapter device 820 according to a personality corresponding to the particular type of predefined or custom instance, as described above. Server 800 may be configured by rebooting using firmware stored in a non-volatile memory on server 800, such as non-volatile memory 235 or 530 described above. In some embodiments, during rebooting of server 800, server 800 may load certain extension firmware, for example, from option ROM on adapter devices 820, and/or a default hypervisor, such as one provided by the web service provider, from, for example, a persistent storage device, such as a hard drive or an SSD. In some embodiments, during rebooting, server 800 may load a customer hypervisor, rather than a hypervisor provided by the web service provider. Server 800 may run the extension firmware to, for example, scrub data in cache or other volatile memory. Server 800 may continue the reboot process by loading separate operating system for each virtual machine. After the operating system is loaded, the client can then run applications on the operating system for each virtual machine.

In some cases, a server may not have all the hardware resources for a client requested instance, such as GPUs, memory, or storage resources. In such cases, a server may offload some portions of the request instance to another server or other specialized hardware resources in the network through, for example, a network fabric as shown in FIG. 1.

Figure 9:
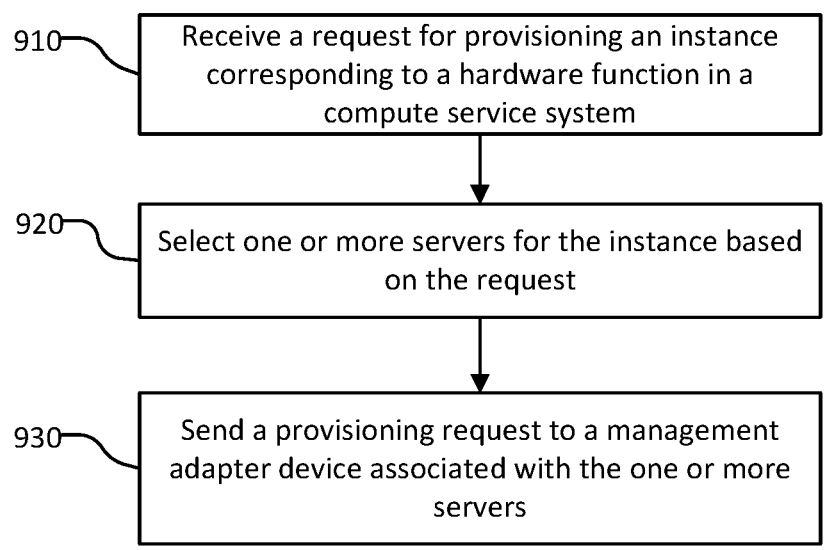
FIG. 9 illustrates an example flow diagram of a process for provisioning an instance by a management service, according to certain aspects of the present disclosure.

FIG. 9 illustrates an example flow diagram of a process 900 for provisioning an instance by a management service, according to certain aspects of the present disclosure. The process may be implemented by the systems described above, such as, for example, management service 120 of FIG. 1 or management service 620 of FIG. 6.

At block 910, the management service may receive a request, for example, from a client, for provisioning an instance corresponding to a hardware function in a compute service system. The client may request an instance using, for example, an API that can take as input various parameters from the user, such as the type of instance the user wants or the type of hardware the user wants (e.g., CPU, GPU, SSD, crypto co-processor), the amount of memory, the amount of storage, the type and bandwidth of networking, or any other additional hardware. As described above, the client may request different types of instances from the compute service system. For example, in some cases, a client may request an instance for complex computational workloads or an instance for applications sensitive to network performance. In some cases, a client may request an instance with high parallel performance capability, for example, for 3D graphics applications. In some cases, a client may request an instance with high speed, low latency, and random I/O access to data. In some cases, a client may request an instance with high storage density and high sequential I/O capability. In some cases, a client may request a specific system hardware configuration. In some cases, a client may select a type of instance from multiple types of instances offered by the compute service system. In some cases, a client may request a particular operating system or hypervisor for the applications. In some cases, a client may request a specific type of hardware, such as GPUs or SSDs. In some cases, a client may request a custom instance by sending a custom firmware or custom code (e.g., custom software or a custom configuration file) with the request. A client may send the request through a network using, for example, a web browser or a user application, as described above with respect to FIG. 1. In some cases, the request may be from the compute service provider, such as a system administrator. For example, the system administrator may request certain number of servers to be preconfigured based on a particular instance type or hardware function, even without requests from clients.

At block 920, in response to receiving the request, the management service may select one or more servers, including servers with specialized hardware resources (e.g., GPUs, memory devices, storage devices), that are available for providing the requested instance based on the request. As described above, the management service may maintain a database that stores configurations (including capacity and other parameters) and status of servers and other hardware resources connected to network fabric(s) in the compute service system, such as how reconfigurable adapter devices are configured on the servers, customer account identifiers of customers currently running on the servers, etc. In some cases, the management service may select a server based on a best match between the hardware configurations of the server and the requested instance. In some cases, the management service may randomly select any available server. In some cases, the management service may select a cluster of closely located servers that are available. In some cases, the management service may select a server and a specialized server or hardware resource, such as a GPU, a memory device, or a storage device. In some cases, the management service may select a same server for multiple client instances, which may run on different virtual machines on the server as described above with respect to, for example, FIGS. 2 and 8.

At block 930, the management service may send a provisioning request to one or more management adapter devices associated with the one or more hardware resources (e.g., servers) through one or more network fabrics, such as network fabric(s) 110 of FIG. 1. In some cases, the provisioning request may include the target or desired hardware/software system configuration for a server determined by the management service. In some cases, the provisioning request may be similar to the request from the client or the system administrator, and the management adapter device may determine the system configuration based on the provisioning request. In some cases, the provisioning request may include custom firmware or custom code (including a custom configuration file) from a client. For example, a separate fleet management service may track configurations of servers and expected demand for different functions. The fleet management service can instruct the management service to provision reconfigurable adapter devices into functionality that is expected to be desired by customers. As such, the fleet of servers can be segmented into various pools of severs configured to have different functionality by changing the reconfigurable adapter devices.

Figure 10:
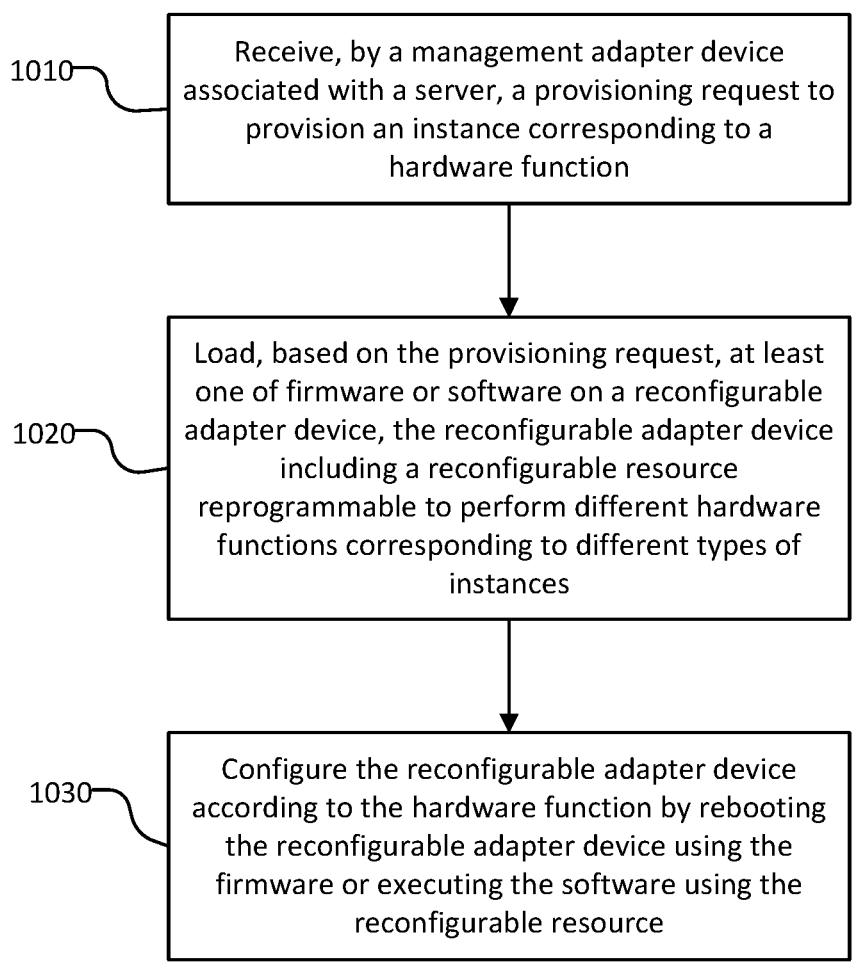
FIG. 10 illustrates an example flow diagram of a process for provisioning an instance by an adapter device, according to certain aspects of the present disclosure.

FIG. 10 illustrates an example flow diagram of a process 1000 for provisioning an instance by a management adapter device, according to certain aspects of the present disclosure. The process may be implemented by the systems described above, such as, for example, adapter devices 210 of FIG. 2, adapter device 400 of FIG. 4, adapter device 550 of FIG. 5, adapter devices 632a and 632b of FIG. 6, adapter devices 720 of FIG. 7, or adapter devices 820 of FIG. 8.

At block 1010, an adapter device (e.g., a management adapter device described above) associated with a hardware resource (e.g., a server) selected by a management service as described above with respect to FIG. 9 may receive a provisioning request to provision a hardware function from the management service. The request could be generated in response to an instance launch request from a customer or by a provisioning request from a fleet management service that configures servers into different pools. The server may include a reconfigurable adapter device that includes a reconfigurable resource reprogrammable to perform different hardware functions corresponding to different types of instances. The provisioning request may include the target hardware/software system configuration for a server determined by the management service. In some cases, the adapter device may determine the target hardware/software system configuration based on the provisioning request from the management service. In some cases, the provisioning request may include custom firmware, custom software, or a custom configuration file from a client for provisioning a custom instance.

At block 1020, the adapter device may load firmware or software (e.g., emulation software, custom code, or a configuration file) on the reconfigurable adapter device of the server based on the provisioning request. The firmware or the software may be stored in a non-volatile memory, such as a flash, a ROM, a hard disk, or an SSD, and may be loaded or enabled in a BIOS device, such as a non-volatile memory. The custom code may be from the client and may be executable by the adapter device or the server associated with the adapter device to configure the adapter device and/or the server. The firmware may include a custom firmware corresponding to a custom instance defined by or for the client. The custom configuration file may also correspond to a custom instance defined by or for the client. The custom firmware, custom code or the custom configuration file may be loaded onto a volatile or non-volatile memory device, such as a BIOS device, on the reconfigurable adapter device of the server.

At block 1030, the adapter device may configure the reconfigurable adapter device by, for example, booting the reconfigurable adapter device using the loaded firmware (include the custom firmware), or running the software, such as the emulation software or custom code on the reconfigurable adapter device. The adapter device may also perform security management for the server before, during, and after the reconfigurable adapter device is configured as described above. After both the reconfigurable adapter device and the server are booted and initialized, the server may be able to perform the desired hardware/software functions for the requested instance, and may be provided to the client such that the client may take control of the server and run applications on it or run virtual machines on it. As also described above, in some embodiments, multiple servers or other hardware resources may be configured using appropriate firmware, software (e.g., emulation software), or configuration files, and provided to a client for provisioning the requested instance.

Figure 11:
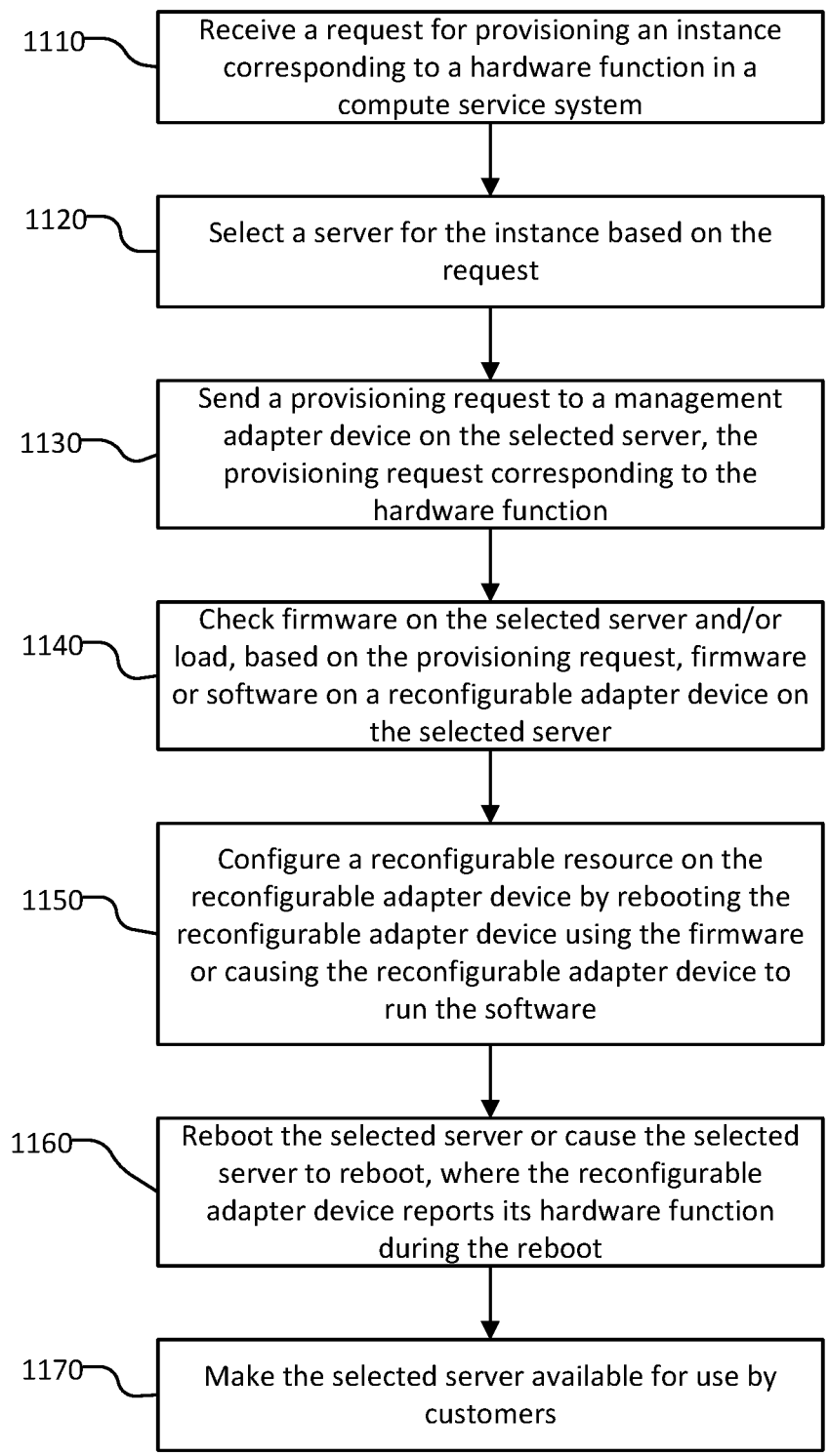
FIG. 11 illustrates an example flow diagram of a process for provisioning an instance by a compute service system, according to certain aspects of the present disclosure.

FIG. 11 illustrates an example flow diagram of a process 1100 for provisioning an instance by a compute service system, according to certain aspects of the present disclosure. The process may be implemented by the systems described above, such as, for example, compute service system 100 of FIG. 1, server 200 of FIG. 2, server 500 of FIG. 5, compute service system 600 of FIG. 6, server 700 of FIG. 7, or server 800 of FIG. 8.

At block 1110, a management service may receive a request for provisioning an instance corresponding to a hardware function in the compute service system as described above with respect to block 910 of FIG. 9. At block 1120, the management service may select a hardware resource, such as a server, including a server with specialized hardware resources (e.g., GPUs, memory devices, or storage devices), that is available for providing the instance based on the request, as described above with respect to block 920 of FIG. 9. At block 1130, the management service may send a provisioning request to a management adapter device on the selected server as described above with respect to block 930 of FIG. 9. The provisioning request may correspond to the hardware function.

At block 1140, the management adapter device on the selected server may receive the provisioning request from the management service. The management adapter device may hold the CPU and BMC in reset and check the firmware of various components on the motherboard, such as the reconfigurable adapter device. After the firmware is checked, the management adapter device may cause the reconfigurable adapter device to configure itself to emulate a hardware device. For example, the management adapter device may load (or instruct the reconfigurable adapter device to load) firmware (including custom firmware if provided) or software (including, e.g., emulation software, custom software, or a configuration file) on the reconfigurable adapter device of the server based on the provisioning request, as described above with respect to blocks 1010 and 1020 of FIG. 10. The reconfigurable adapter device may include a reconfigurable resource reprogrammable to perform different hardware functions corresponding to different types of instances.

At block 1150, the management adapter device may configure the reconfigurable resources by, for example, booting the reconfigurable adapter device using the loaded firmware, or causing the reconfigurable adapter device to run the software (e.g., emulation software) on the reconfigurable adapter device by sending a request to the reconfigurable adapter device, which causes the reconfigurable adapter device to load an emulator corresponding to the request in to memory. At block 1160, the selected server may reboot the CPU or release the CPU from reset to cause it to start a boot process to load the appropriated firmware and/or hypervisor or operating system. As described above, during the boot process executed by the CPU of the selected server, the server may enumerate the attached hardware, during which the reconfigurable adapter device may report or otherwise identify its configured hardware function to the server. At block 1170, the server may be made available for use by customers. For example, when the CPU starts to boot, the management adapter device may make a boot loader available that can cause the CPU to load a bare metal instance or a virtualization system. For example, in the case of a bare metal server, the boot loader may cause the CPU to load a customer selected image directly on the hardware of the server. In another situation, the management adapter device may expose a boot loader for a virtualization system, which can be used to host virtual machines from one or more customers.

It is noted that even though FIGS. 9-11 describe the example processes as sequential operations, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

Figure 12:
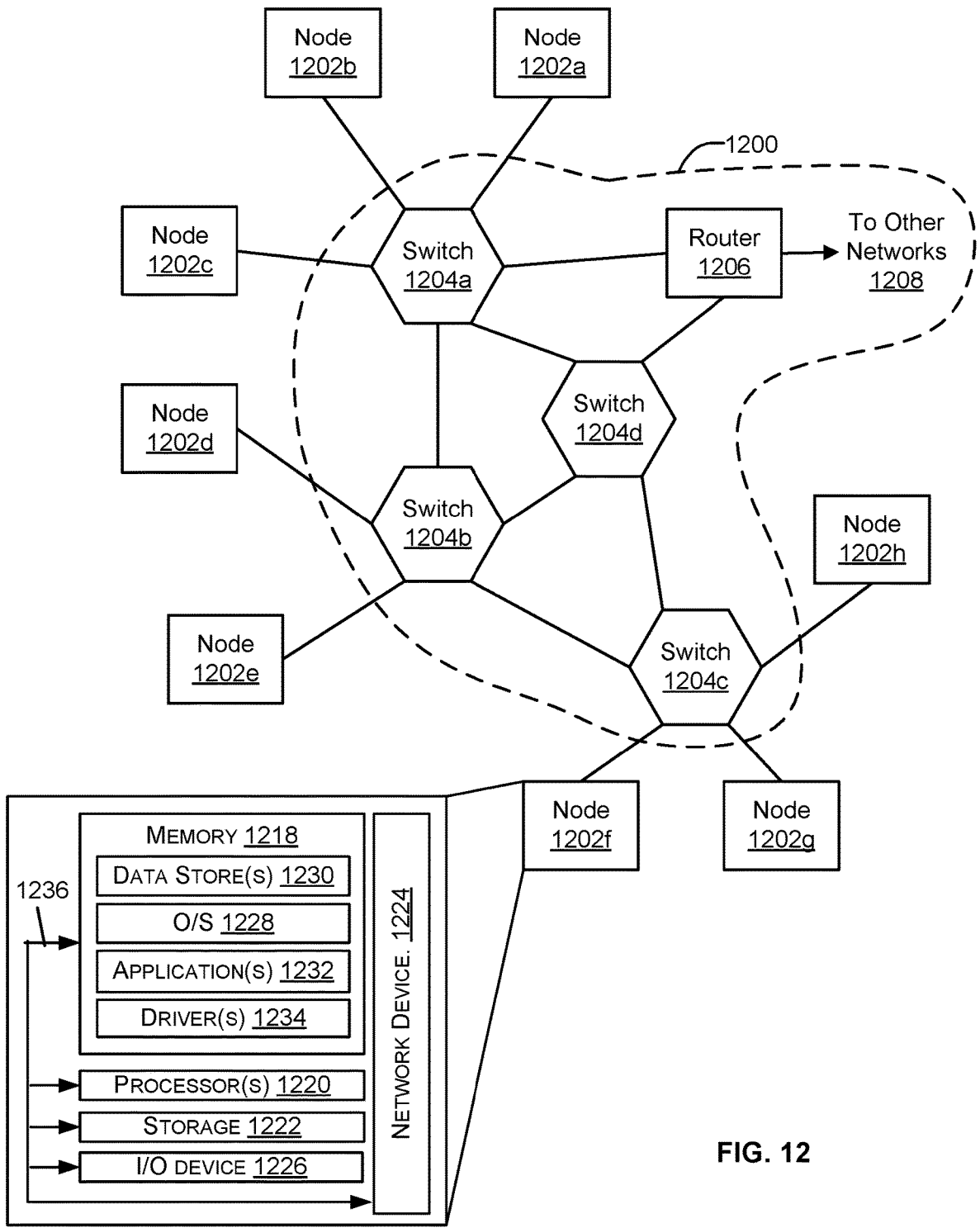
FIG. 12 illustrates an example architecture for features and systems described herein that includes one or more service provider computers and/or a user device connected via one or more networks, according to certain aspects of the present disclosure.

FIG. 12 illustrates a network 1200, illustrating various different types of network devices, such as various servers described above. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more network devices for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more applications 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, applications 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between applications 1232 and the operating system 1228, and/or applications 1232 and peripheral devices accessible to the service provider computer. In many cases, the drivers 1234 may include drivers that provide well-understood functionality (e.g., printer drivers, display drivers, hard disk drivers, or solid state disk drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200. The network device(s) 1224 of FIG. 12 may include similar components discussed above with reference to the servers.

In some implementations, the network device 1224 is a peripheral device, such as a PCI-based device. In these implementations, the network device 1224 includes a PCI interface for communicating with a server. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a server. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface 308 may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as, for example, a virtual machine) running on a server.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language, such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An apparatus, comprising:
    a client device configured to send an instance request to a compute service system, wherein the instance request indicates a resource requirement for an instance to be launched on the compute service system, wherein the compute service system includes a management service that, in response to the instance request:
        selects a server from among a plurality of servers in the compute service system based on determining that the server is configurable to at least partially meet the resource requirement; and
        sends a provisioning request to the selected server, the provisioning request comprising information for programming a reconfigurable resource of an adapter device in the selected server according to a particular hardware function; and
    wherein the client device is further configured to access, through the instance running on the selected server, the reconfigurable resource after the adapter device has been reported to the selected server as having been configured according to the particular hardware function, the adapter device being reported during a reboot of the server or after the reconfigurable resource is programmed, during a reboot of the adapter device, according to the particular hardware function.

2. The apparatus of claim 1, wherein the provisioning request includes executable code or a configuration file that, when processed by the adapter device, programs the reconfigurable resource according to the particular hardware function.

3. The apparatus of claim 2, wherein the provisioning request includes the executable code, and wherein the executable code comprises firmware used to reboot the adapter device or emulation software executed by the adapter device.

4. The apparatus of claim 2, wherein the executable code or configuration file is provided by a user of the client device.

5. The apparatus of claim 1, wherein the provisioning request includes an operating system or hypervisor, and wherein the operating system or hypervisor is configured to, after being loaded onto the selected server, communicate with the adapter device having the reconfigurable resource programmed according to the particular hardware function.

6. The apparatus of claim 1, wherein the instance request from the client device identifies the instance as being one of a plurality of instance types available from the compute service system.

7. The apparatus of claim 1, wherein the instance runs on a virtual machine of the selected server, and wherein the virtual machine is emulated by the adapter device having the reconfigurable resource programmed according to the particular hardware function.

8. The apparatus of claim 7, wherein the virtual machine is managed by a hypervisor specified in the instance request from the client device.

9. The apparatus of claim 1, wherein a plurality of servers are selected in response to the instance request from the client device, each server of the plurality of servers including an adapter device with a reconfigurable resource that is programmed according to the particular hardware function such that the resource requirement is collectively met by all the servers of the plurality of servers.

10. The apparatus of claim 1, wherein the instance request from the client device specifies one or more of the following: a number of processor cores, a type of central processing unit, a size of a memory, a size of a solid state drive, an operating system, and a hypervisor.

11. The apparatus of claim 10, wherein the instance request specifies a graphics processing unit.

12. The apparatus of claim 1, wherein the adapter device is coupled to other portions of the selected server through one of a peripheral component interconnect (PCI) bus, a peripheral component interconnect express (PCIe) bus, and a peripheral component interconnect extended (PCI-X) bus.

13. The apparatus of claim 1, wherein the reconfigurable resource comprises at least one of a field-programmable gate array (FPGA), a system-on-chip (SoC), an application specific integrated circuit (ASIC), a programmable array logic (PAL), or a complex programmable logic device (CPLD).

14. A method, comprising:
sending, from a client device, an instance request to a compute service system over a network, wherein the instance request indicates a resource requirement for an instance to be launched on the compute service system, and wherein the compute service system includes a management service that, in response to the instance request:
selects a server from among a plurality of servers in the compute service system based on determining that the server is configurable to at least partially meet the resource requirement; and
sends a provisioning request to the selected server, the provisioning request comprising information for programming a reconfigurable resource of an adapter device in the selected server according to a particular hardware function; and
accessing, through the instance running on the selected server, the reconfigurable resource after the adapter device has been reported to the selected server as having been configured according to the particular hardware function, the adapter device being reported during a reboot of the server or after the reconfigurable resource is programmed, during a reboot of the adapter device, according to the particular hardware function.

15. The method of claim 14, wherein the provisioning request includes executable code or a configuration file that, when processed by the adapter device, programs the reconfigurable resource according to the particular hardware function.

16. The method of claim 14, wherein the instance runs on a virtual machine of the selected server, and wherein the virtual machine is emulated by the adapter device having the reconfigurable resource programmed according to the particular hardware function.

17. The method of claim 14, wherein the instance request from the client device specifies one or more of the following: a number of processor cores, a type of central processing unit, a size of a memory, a size of a solid state drive, an operating system, and a hypervisor.

18. The method of claim 16, wherein the virtual machine is managed by a hypervisor specified in the instance request from the client device.

19. The method of claim 15, wherein the provisioning request includes the executable code, and wherein the executable code comprises firmware used to reboot the adapter device or emulation software executed by the adapter device.

20. The method of claim 14, wherein the provisioning request includes an operating system or hypervisor, and wherein the operating system or hypervisor is configured to, after being loaded onto the selected server, communicate with the adapter device having the reconfigurable resource programmed according to the particular hardware function.

* * * * *